United States Patent [19]
Toda

[11] Patent Number: 5,903,671
[45] Date of Patent: May 11, 1999

[54] DATA COMPRESSION METHOD AND APPARATUS THEREFOR

[75] Inventor: Yukari Toda, Yokohama, Japan

[73] Assignee: Canon Kabushiki Kaisha, Tokyo, Japan

[21] Appl. No.: 08/362,916

[22] Filed: Dec. 23, 1994

[30] Foreign Application Priority Data

Dec. 27, 1993 [JP] Japan ..................................... 5-332064
Dec. 9, 1994 [JP] Japan ..................................... 6-306063

[51] Int. Cl.$^6$ ........................................................ G06K 9/36
[52] U.S. Cl. ........................ 382/236; 382/232; 382/238; 382/239; 358/261.2
[58] Field of Search ..................................... 382/232, 270, 382/239, 261, 141, 236, 238; 358/456, 261.2; 364/413.13; 395/600

[56] References Cited

U.S. PATENT DOCUMENTS 4,068,298 1/1978 Dechant et al. ......................... 395/600
4,646,148 2/1987 Lienard et al. ......................... 382/236
4,654,719 3/1987 Tomita ..................................... 358/261
5,331,551 7/1994 Tsuruoka et al. .................. 364/413.13
5,559,896 9/1996 Okuda ..................................... 382/141

FOREIGN PATENT DOCUMENTS 60-186971 9/1985 Japan .............................. G06F 15/62

Primary Examiner—Jose L. Couso
Assistant Examiner—Anh Hong Do
Attorney, Agent, or Firm—Fitzpatrick, Cella, Harper & Scinto

[57] ABSTRACT

In order to enhance the high efficiency for a reversible code, pixel data d[i] is input one pixel by one pixel, and a differential value diff is calculated between a present pixel data d[i] and a just previous pixel data d[i−1]. It is then determined whether the differential value diff is zero or not. A number m of holding circuits hold vectors vect[n] having high occurability, and a number n of comparators compare the differential value diff with the vectors vect[n]. A compression code is then determined in accordance with the differential value diff and the comparisons by the comparators.

24 Claims, 37 Drawing Sheets

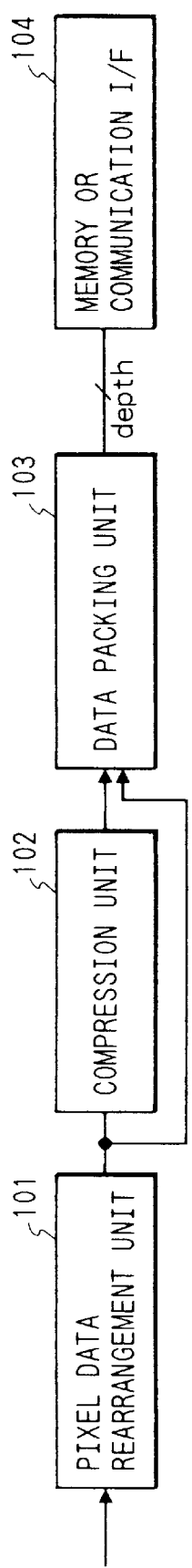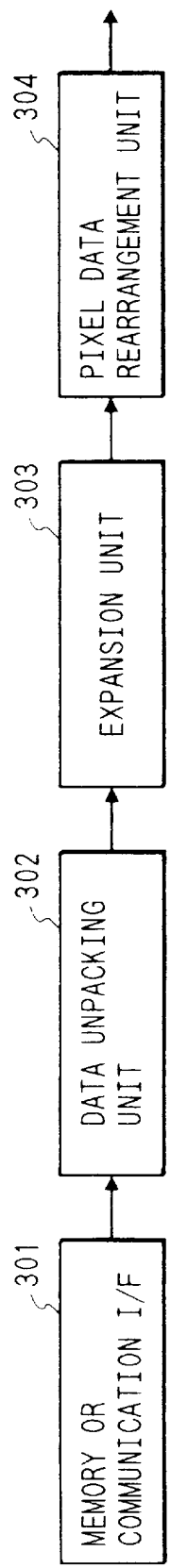

FIG. 10A

| | | | 24 BITS |
|---|---|---|---|
| code 0 | 0 0 0 0 1 0 0 0 1 0 1 0 0 0 1 0 0 0 1 0 1 0 1 | | |
| code 1 | 0 0 0 1 0 1 1 0 | | 7 BITS |
| code 2 | 0 0 1 1 0 | | 4 BITS |

FIG. 10B

| code 0 | 0 0 0 0 [1] 0 0 0 1 1 1 1 1 [0] 1 1 1 1 1 [0] 0 0 [1] 1 |
| code 1 | 0 0 0 0 0 [1] [0] 1 [0] [1] [1] [0] [0] 1 |
| code 2 | 0 0 1 [1] 0 [1] |

FIG. 12A

| X | 255 | −64 | 64 | −64 | 64 | −191 | 191 | 64 | −255 | 255 | −255 | 191 |
|---|---|---|---|---|---|---|---|---|---|---|---|---|
| Y | 100 | 191 | 255 | 191 | 255 | −255 | −64 | 255 | −191 | 64 | −191 | −64 |

FIG. 12B

| X' | −255 | 64 | −64 | 64 | −191 | 191 | −191 | 255 | −255 | 191 | −255 | 255 | 191 |
|---|---|---|---|---|---|---|---|---|---|---|---|---|---|
| Y' | 155 | −255 | −191 | −255 | 64 | 255 | 255 | −64 | 191 | −64 | −64 | −191 | −64 |
| −X' | 255 | −64 | 64 | −64 | 191 | −191 | 191 | −255 | 255 | −191 | 255 | −255 | 191 |
| −(X'+Y') | 100 | 191 | 255 | 191 | −255 | −64 | −64 | 255 | −191 | 64 | −191 | −64 |

| 3403a | | | | | | | | 3403b | | | | | | | |
|---|---|---|---|---|---|---|---|---|---|---|---|---|---|---|---|
| 214 | 171 | 128 | 171 | 171 | 128 | 128 | 214 | 171 | 128 | 128 | 171 | 128 | 128 | 128 | 128 |
| 171 | 214 | 128 | 171 | 171 | 128 | 128 | 171 | 171 | 128 | 128 | 171 | 128 | 128 | 214 | 214 |
| 128 | 171 | 171 | 171 | 171 | 128 | 128 | 128 | 214 | 128 | 128 | 128 | 171 | 128 | 214 | 171 |
| 171 | 171 | 128 | 171 | 128 | 128 | 128 | 171 | 214 | 171 | 171 | 128 | 128 | 171 | 128 | 128 |
| 214 | 214 | 128 | 128 | 128 | 214 | 128 | 214 | 214 | 214 | 214 | 128 | 214 | 128 | 128 | 128 |
| 214 | 214 | 214 | 214 | 214 | 214 | 128 | 214 | 128 | 214 | 214 | 128 | 214 | 128 | 128 | 128 |
| 171 | 171 | 214 | 214 | 214 | 171 | 128 | 171 | 128 | 171 | 171 | 214 | 171 | 171 | 128 | 128 |
| 171 | 171 | 171 | 214 | | 128 | 128 | 171 | 128 | 128 | 128 | 214 | | 171 | 128 | 128 |

| | | | | | | | | |
|---|---|---|---|---|---|---|---|---|
| −55.0 | −52.7 | −48.3 | 239.1 | 37.0 | 95.9 | −20.0 | 42.9 | |
| 168.7 | −98.9 | −49.6 | 90.9 | −137.2 | 32.4 | −20.6 | 4.3 | |
| −48.3 | 79.1 | −63.2 | 5.5 | 88.4 | 27.8 | −26.2 | −4.7 | |
| −136.4 | −141.3 | −36.3 | −54.8 | 2.3 | −52.7 | −15.0 | −14.5 | ~3501a |
| 110.0 | −123.9 | −145.0 | 18.0 | 111.0 | 12.0 | −60.1 | −24.6 | |
| −15.2 | 82.2 | −7.2 | −15.7 | −11.5 | 70.2 | −3.0 | −52.0 | |
| −20.0 | 56.8 | −26.2 | −100.4 | −76.7 | −8.9 | −10.8 | −38.0 | |
| 44.6 | −32.7 | 74.3 | −47.7 | −91.7 | −50.8 | 30.8 | 9.5 | |
| 407.5 | −113.3 | −140.9 | −34.5 | −92.5 | −23.0 | −1.7 | −22.5 | |
| 36.8 | 151.7 | −150.1 | −17.1 | −58.0 | −68.4 | −56.2 | −18.2 | |
| −233.4 | −64.3 | −76.2 | 7.9 | −58.4 | −11.8 | 20.7 | −27.2 | |
| 69.2 | 120.9 | −59.6 | 9.0 | 35.9 | −14.0 | 16.4 | 7.1 | ~3501b |
| −55.5 | 32.9 | 72.5 | 42.3 | 18.5 | −16.2 | 30.0 | −31.2 | |
| 24.0 | −7.1 | −51.9 | −40.2 | 46.2 | −13.5 | 40.0 | 9.9 | |
| −7.6 | 6.7 | 57.7 | −4.6 | 4.1 | −44.2 | 2.2 | −3.5 | |
| −11.5 | −44.3 | −40.1 | −42.6 | 7.3 | −17.1 | 13.5 | 0.8 | |
| 74.5 | −35.8 | −38.3 | 130.7 | 55.5 | 65.1 | −44.2 | −26.0 | 3501 |
| 9.7 | −241.6 | −36.4 | 109.0 | 62.9 | 90.3 | 7.2 | −33.2 | |
| 340.1 | 7.9 | −5.4 | −13.9 | 126.7 | 2.8 | 13.1 | 11.8 | |
| −129.0 | 129.0 | 107.8 | −18.5 | 67.5 | −43.3 | 5.4 | −0.5 | ~3501c |
| −18.5 | −109.4 | 38.3 | −7.6 | −55.5 | 17.1 | 44.2 | −2.9 | |
| −1.0 | 42.0 | −56.3 | 9.1 | −40.1 | 12.2 | −15.5 | 13.6 | |
| −0.7 | −19.0 | 13.1 | 33.5 | −32.5 | −6.7 | −31.6 | −28.4 | |
| −32.6 | 19.1 | −116.0 | −48.8 | 47.0 | −6.5 | −14.8 | 26.0 | |
| 74.5 | −193.1 | −72.5 | 6.5 | 18.5 | 48.8 | −30.0 | −0.7 | |
| −317.3 | 103.2 | 142.9 | 24.1 | 1.2 | 20.8 | −13.4 | 24.5 | |
| −106.7 | −73.7 | 102.4 | −19.0 | 58.4 | 28.4 | 20.7 | 20.2 | |
| 209.1 | 5.3 | 71.5 | −82.0 | −41.4 | −22.5 | 4.1 | 28.4 | |
| 55.5 | −149.6 | −52.5 | −3.7 | −18.5 | −2.5 | −78.4 | −29.7 | ~3501d |
| −21.4 | −102.4 | −63.5 | −11.7 | −18.4 | 40.5 | −9.3 | 20.6 | |
| −15.9 | 2.8 | 57.7 | −15.7 | −4.1 | −27.5 | −28.4 | −13.9 | |
| −39.7 | −38.7 | 3.8 | −110.1 | −45.3 | −49.9 | 16.0 | 12.3 | |
| −44.6 | −23.3 | 2.2 | 2.4 | −7.9 | 4.5 | 7.6 | 5.4 | |
| 9.7 | 6.5 | −11.8 | 1.6 | −7.3 | 5.2 | 1.6 | 1.5 | |
| −12.9 | 7.8 | 6.4 | −1.1 | −6.0 | 2.6 | −1.1 | −1.7 | |
| −3.2 | −9.3 | −12.0 | 3.2 | −4.2 | −0.6 | −1.5 | 0.9 | |
| 2.6 | 6.2 | −7.3 | −9.7 | −2.6 | −1.9 | −1.7 | 2.7 | ~3502a |
| 0.4 | −0.4 | 4.7 | 5.4 | −3.3 | −1.5 | −1.2 | −2.8 | |
| −1.3 | 1.2 | 2.4 | 1.5 | 1.5 | −5.4 | −4.7 | 0.0 | |
| 1.6 | 0.5 | 0.5 | −1.2 | 0.7 | 4.6 | 0.7 | −4.8 | |
| −54.2 | −4.4 | 7.5 | −7.5 | −3.5 | 6.2 | 4.5 | −1.5 | 3502 |
| −14.6 | 12.0 | −15.5 | −14.4 | 4.8 | 0.4 | 1.5 | 0.5 | |
| 11.0 | 18.0 | 3.9 | −11.5 | 3.6 | 1.1 | 0.9 | −4.9 | |
| 3.8 | −12.2 | 6.0 | 10.8 | 7.7 | −5.4 | 3.0 | 2.0 | |
| 1.7 | −8.2 | 1.6 | −7.2 | −0.0 | 4.3 | −0.7 | −4.0 | |
| −1.1 | −0.5 | 6.8 | −2.4 | −4.8 | 0.9 | 1.6 | −2.5 | ~3502b |
| −0.8 | 0.7 | −0.9 | −1.6 | 4.2 | −0.4 | 1.4 | 1.9 | |
| −3.4 | 0.0 | 2.6 | −3.0 | −4.9 | −5.4 | 1.3 | −2.8 | |

FIG. 17A

|       |        |       |       |       |       |       |       |       |
|------:|-------:|------:|------:|------:|------:|------:|------:|-------|
| 274.1 | 143.1  | -13.5 | -14.6 | 48.4  | -27.6 | -46.7 | -33.2 |       |
| -59.7 | -40.1  | 72.7  | -9.8  | 45.1  | -31.8 | -9.8  | -9.3  |       |
| 79.0  | -48.0  | -39.6 | 7.0   | 36.8  | -15.7 | 6.9   | 10.2  |       |
| 19.5  | 57.1   | 73.5  | -19.8 | 25.9  | 3.5   | 9.2   | -5.3  |       |
| -16.1 | -38.3  | 45.0  | 59.7  | 16.1  | 11.4  | 10.4  | -16.3 | ~3503a |
| -2.6  | 2.2    | -28.9 | -33.2 | 20.0  | 9.0   | 7.6   | 17.2  |       |
| 8.8   | -7.1   | -14.6 | -9.5  | -9.4  | 33.0  | 28.8  | -0.2  |       |
| -9.6  | -3.0   | -2.8  | 7.2   | -4.3  | -28.2 | 4.2   | 29.4  |       |
|       |        |       |       |       |       |       |       |       |
| 333.2 | 26.9   | -46.3 | 46.3  | 21.5  | -37.9 | -27.4 | 9.0   |       |
| 89.4  | -74.0  | 95.0  | 88.3  | -29.  | -2.2  | -9.3  | -3.3  | ⟵3503 |
| -67.8 | -110.9 | -23.7 | 70.7  | -22.3 | -6.9  | -5.4  | 29.8  |       |
| -23.3 | 74.8   | -39.6 | -66.6 | -47.1 | 33.2  | -18.7 | -12.5 |       |
| -10.8 | 50.3   | -9.9  | 44.0  | 0.0   | -26.5 | 4.1   | 24.6  |       |
| 6.5   | 3.0    | -41.5 | 14.8  | 29.4  | -5.5  | -9.6  | 15.3  | ~3503b |
| 4.8   | -4.2   | 5.4   | 10.1  | -25.7 | 2.4   | -8.5  | -11.5 |       |
| 21.0  | -0.1   | -15.7 | 18.7  | 30.3  | 33.3  | -7.8  | 17.1  |       |

| 8 | 4 | 0 | 0 | 0 | 0 | 0 | 0 |
|---|---|---|---|---|---|---|---|
| -2 | -1 | 1 | 0 | 0 | 0 | 0 | 0 |
| 2 | -1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 10 | 1 | -1 | 0 | 0 | 0 | 0 | 0 |
| 2 | -2 | 2 | 1 | 0 | 0 | 0 | 0 |
| -1 | -2 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 18B

| | | | | | | | |
|---:|---:|---:|---:|---:|---:|---:|---:|
| −64.0 | −44.0 | −40.0 | 224.0 | 48.0 | 80.0 | 0.0 | 0.0 |
| 168.0 | −95.0 | −56.0 | 76.0 | −156.0 | 0.0 | 0.0 | 0.0 |
| −56.0 | 78.0 | −64.0 | 0.0 | 80.0 | 0.0 | 0.0 | 0.0 |
| −140.0 | −136.0 | −44.0 | −58.0 | 0.0 | 0.0 | 0.0 | 0.0 |
| 108.0 | −132.0 | −148.0 | 0.0 | 136.0 | 0.0 | 0.0 | 0.0 |
| 0.0 | 70.0 | 0.0 | 0.0 | 0.0 | 0.0 | 0.0 | 0.0 |
| 0.0 | 0.0 | 0.0 | −174.4 | 0.0 | 0.0 | 0.0 | 0.0 |
| 0.0 | 0.0 | 0.0 | 0.0 | 0.0 | 0.0 | 0.0 | 0.0 |
| 416.0 | −110.0 | −140.0 | −32.0 | −96.0 | 0.0 | 0.0 | 0.0 |
| 48.0 | 144.0 | −140.0 | 0.0 | −52.0 | −116.0 | 0.0 | 0.0 |
| −224.0 | −52.0 | −64.0 | 0.0 | −80.0 | 0.0 | 0.0 | 0.0 |
| 56.0 | 136.0 | −44.0 | 0.0 | 0.0 | 0.0 | 0.0 | 0.0 |
| −72.0 | 44.0 | 74.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 64.0 | −44.0 | −40.0 | 128.0 | 48.0 | 80.0 | 0.0 | 0.0 |
| 0.0 | −240.0 | −28.0 | 114.0 | 52.0 | 116.0 | 0.0 | 0.0 |
| 336.0 | 0.0 | 0.0 | 0.0 | 160.0 | 0.0 | 0.0 | 0.0 |
| −140.0 | 136.0 | 88.0 | 0.0 | 102.0 | 0.0 | 0.0 | 0.0 |
| −36.0 | −88.0 | 74.0 | 0.0 | 0.0 | 0.0 | 0.0 | 0.0 |
| 0.0 | 70.0 | −110.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | −190.0 | 0.0 | 0.0 | 0.0 | 0.0 | 0.0 |
| 64.0 | −198.0 | −80.0 | 0.0 | 0.0 | 80.0 | 0.0 | 0.0 |
| −312.0 | 96.0 | 140.0 | 38.0 | 0.0 | 0.0 | 0.0 | 0.0 |
| −112.0 | −78.0 | 96.0 | 0.0 | 80.0 | 0.0 | 0.0 | 0.0 |
| 196.0 | 0.0 | 88.0 | −58.0 | 0.0 | 0.0 | 0.0 | 0.0 |
| 72.0 | −132.0 | −74.0 | 0.0 | 0.0 | 0.0 | 0.0 | 0.0 |
| 0.0 | −70.0 | −110.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | −196.0 | 0.0 | 0.0 | 0.0 | 0.0 |

⎫ 3701

| | | | | | | | |
|---:|---:|---:|---:|---:|---:|---:|---:|
| −34.0 | −36.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| −68.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |

| 272.0 | 144.0 | 0.0 | 0.0 | 0.0 | 0.0 | 0.0 | 0.0 |
|---|---|---|---|---|---|---|---|
| −72.0 | −42.0 | 52.0 | 0.0 | 0.0 | 0.0 | 0.0 | 0.0 |
| 96.0 | −52.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| | | | | | | | |
| 340.0 | 36.0 | −48.0 | 0.0 | 0.0 | 0.0 | 0.0 | 0.0 |
| 72.0 | −84.0 | 104.0 | 132.0 | 0.0 | 0.0 | 0.0 | 0.0 |
| −48.0 | −104.0 | 0.0 | 0.0 | 0.0 | 0.0 | 0.0 | 0.0 |
| 0.0 | 132.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |

| 55  | 31  | 94  | 192 | 223 | 208 | 162 | 98  | 71  | 220 | 234 | 169 | 194 | 190 | 96  | 34  |
|-----|-----|-----|-----|-----|-----|-----|-----|-----|-----|-----|-----|-----|-----|-----|-----|
| 189 | 123 | 62  | 56  | 145 | 255 | 201 | 25  | 62  | 194 | 227 | 201 | 238 | 235 | 160 | 115 |
| 204 | 201 | 169 | 98  | 89  | 175 | 186 | 87  | 102 | 163 | 209 | 208 | 242 | 244 | 208 | 199 |
| 197 | 108 | 88  | 151 | 211 | 239 | 196 | 108 | 186 | 202 | 202 | 197 | 205 | 206 | 208 | 224 |
| 87  | 12  | 32  | 130 | 187 | 200 | 187 | 150 | 228 | 216 | 221 | 221 | 201 | 194 | 204 | 207 |
| 51  | 57  | 81  | 71  | 25  | 43  | 101 | 117 | 182 | 180 | 223 | 244 | 214 | 216 | 224 | 191 |
| 222 | 83  | 20  | 58  | 82  | 75  | 46  | 0   | 98  | 103 | 154 | 187 | 162 | 206 | 241 | 189 |
| 206 | 50  | 65  | 210 | 194 | 60  | 36  | 106 | 43  | 41  | 90  | 96  | 76  | 165 | 240 | 192 |
| 238 | 19  | 47  | 227 | 230 | 178 | 195 | 193 | 81  | 37  | 56  | 91  | 78  | 95  | 164 | 208 |
| 205 | 55  | 64  | 161 | 174 | 213 | 255 | 215 | 185 | 78  | 14  | 11  | 23  | 63  | 91  | 71  |
| 35  | 42  | 131 | 201 | 215 | 255 | 208 | 47  | 44  | 64  | 109 | 106 | 56  | 55  | 74  | 52  |
| 73  | 67  | 67  | 40  | 54  | 158 | 183 | 81  | 55  | 50  | 94  | 162 | 222 | 255 | 184 | 42  |
| 59  | 55  | 57  | 51  | 59  | 95  | 91  | 35  | 90  | 170 | 255 | 238 | 162 | 172 | 226 | 231 |
| 222 | 165 | 99  | 63  | 46  | 34  | 45  | 73  | 203 | 174 | 180 | 194 | 199 | 232 | 233 | 180 |
| 186 | 199 | 214 | 238 | 221 | 126 | 44  | 39  | 58  | 97  | 192 | 240 | 196 | 175 | 203 | 216 |
| 218 | 219 | 193 | 188 | 207 | 190 | 193 | 248 | 56  | 31  | 96  | 192 | 217 | 215 | 214 | 195 |

~3801

| 118 | ‡ | 118 | ‡ | 120 | ‡ | 123 | ‡ | 125 | ‡ | 127 | ‡ | 129 | ‡ | 130 | ‡ |
|-----|---|-----|---|-----|---|-----|---|-----|---|-----|---|-----|---|-----|---|
| 118 | ‡ | 118 | ‡ | 120 | ‡ | 123 | ‡ | 125 | ‡ | 127 | ‡ | 129 | ‡ | 130 | ‡ |
| 118 | ‡ | 118 | ‡ | 120 | ‡ | 123 | ‡ | 125 | ‡ | 127 | ‡ | 129 | ‡ | 130 | ‡ |
| 118 | ‡ | 118 | ‡ | 120 | ‡ | 123 | ‡ | 125 | ‡ | 127 | ‡ | 129 | ‡ | 130 | ‡ |
| 118 | ‡ | 118 | ‡ | 120 | ‡ | 123 | ‡ | 125 | ‡ | 127 | ‡ | 129 | ‡ | 130 | ‡ |
| 118 | ‡ | 118 | ‡ | 120 | ‡ | 123 | ‡ | 125 | ‡ | 127 | ‡ | 129 | ‡ | 130 | ‡ |
| 118 | ‡ | 118 | ‡ | 120 | ‡ | 123 | ‡ | 125 | ‡ | 127 | ‡ | 129 | ‡ | 130 | ‡ |
| 118 | ‡ | 118 | ‡ | 120 | ‡ | 123 | ‡ | 125 | ‡ | 127 | ‡ | 129 | ‡ | 130 | ‡ |
| 120 | ‡ | 120 | ‡ | 120 | ‡ | 120 | ‡ | 120 | ‡ | 120 | ‡ | 120 | ‡ | 120 | ‡ |
| 120 | ‡ | 120 | ‡ | 120 | ‡ | 120 | ‡ | 120 | ‡ | 120 | ‡ | 120 | ‡ | 120 | ‡ |
| 120 | ‡ | 120 | ‡ | 120 | ‡ | 120 | ‡ | 120 | ‡ | 120 | ‡ | 120 | ‡ | 120 | ‡ |
| 120 | ‡ | 120 | ‡ | 120 | ‡ | 120 | ‡ | 120 | ‡ | 120 | ‡ | 120 | ‡ | 120 | ‡ |
| 120 | ‡ | 120 | ‡ | 120 | ‡ | 120 | ‡ | 120 | ‡ | 120 | ‡ | 120 | ‡ | 120 | ‡ |
| 120 | ‡ | 120 | ‡ | 120 | ‡ | 120 | ‡ | 120 | ‡ | 120 | ‡ | 120 | ‡ | 120 | ‡ |
| 120 | ‡ | 120 | ‡ | 120 | ‡ | 120 | ‡ | 120 | ‡ | 120 | ‡ | 120 | ‡ | 120 | ‡ |
| 120 | ‡ | 120 | ‡ | 120 | ‡ | 120 | ‡ | 120 | ‡ | 120 | ‡ | 120 | ‡ | 120 | ‡ |

| 180 | 173 | 152 | 154 | 153 | 159 | 167 | 174 |
|---|---|---|---|---|---|---|---|
| 179 | 172 | 160 | 150 | 146 | 147 | 152 | 156 |
| 179 | 172 | 159 | 147 | 137 | 132 | 131 | 131 |
| 181 | 174 | 163 | 148 | 135 | 123 | 115 | 111 |
| 185 | 181 | 172 | 159 | 143 | 128 | 115 | 108 |
| 191 | 190 | 185 | 176 | 162 | 145 | 130 | 120 |
| 198 | 199 | 199 | 195 | 183 | 157 | 151 | 140 |
| 202 | 205 | 208 | 207 | 197 | 182 | 166 | 155 |
| 207 | 166 | 131 | 139 | 180 | 200 | 197 | 175 |
| 186 | 155 | 131 | 145 | 185 | 215 | 211 | 194 |
| 174 | 156 | 145 | 160 | 191 | 212 | 210 | 198 |
| 191 | 185 | 180 | 182 | 186 | 184 | 174 | 165 |
| 210 | 216 | 217 | 202 | 175 | 145 | 125 | 117 |
| 189 | 212 | 227 | 210 | 166 | 124 | 104 | 102 |
| 126 | 167 | 206 | 204 | 165 | 130 | 123 | 132 |
| 68 | 123 | 181 | 195 | 168 | 145 | 151 | 170 |

─3803 (upper half)

| 32 | 22 | 20 | 32 | 48 | 80 | 102 | 122 |
|----|----|----|----|----|----|-----|-----|
| 24 | 24 | 28 | 38 | 52 | 116 | 120 | 110 |
| 28 | 26 | 32 | 48 | 80 | 114 | 138 | 112 |
| 28 | 34 | 44 | 58 | 102 | 174 | 160 | 124 |
| 36 | 44 | 74 | 116 | 136 | 218 | 206 | 154 |
| 48 | 70 | 110 | 128 | 162 | 208 | 226 | 184 |
| 98 | 128 | 156 | 174 | 206 | 242 | 240 | 202 |
| 144 | 184 | 190 | 196 | 224 | 200 | 206 | 198 |

4001

| 34 | 36 | 48 | 94 | 132 | 198 | 198 | 198 |
|----|----|----|----|-----|-----|-----|-----|
| 36 | 42 | 52 | 132 | 198 | 198 | 198 | 198 |
| 48 | 52 | 112 | 198 | 198 | 198 | 198 | 198 |
| 94 | 132 | 198 | 198 | 198 | 198 | 198 | 198 |
| 198 | 198 | 198 | 198 | 198 | 198 | 198 | 198 |
| 198 | 198 | 198 | 198 | 198 | 198 | 198 | 198 |
| 198 | 198 | 198 | 198 | 198 | 198 | 198 | 198 |
| 198 | 198 | 198 | 198 | 198 | 198 | 198 | 198 |

4002

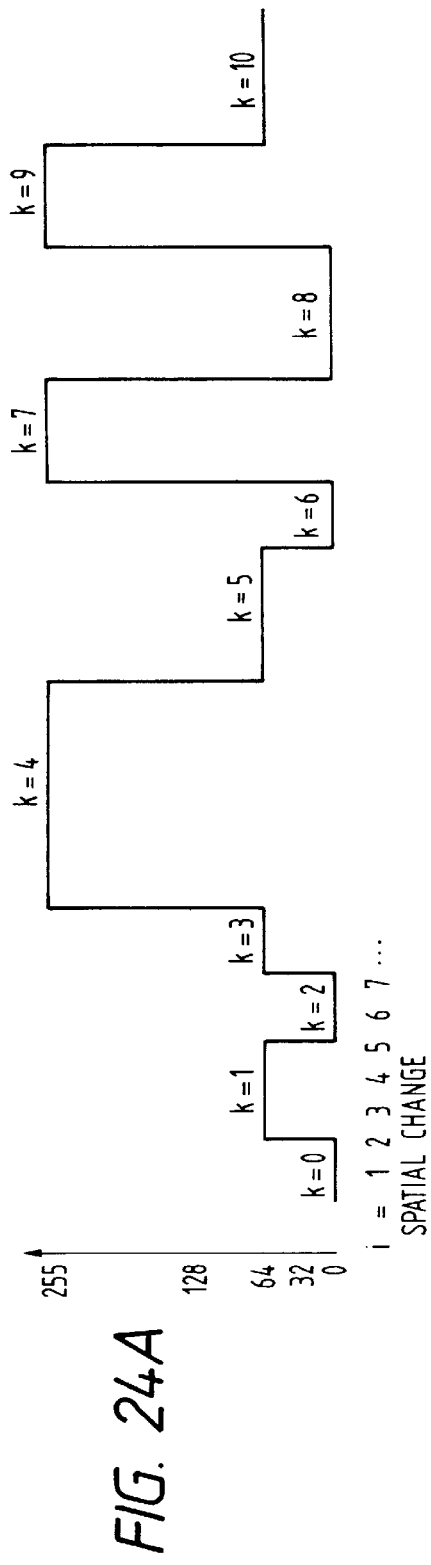
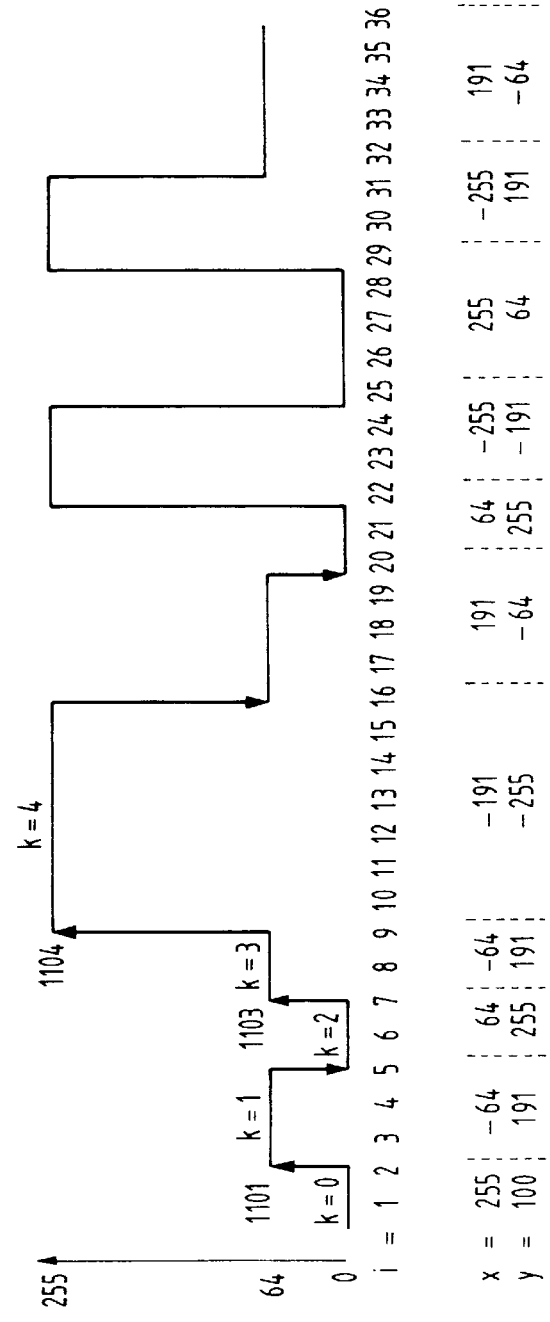
FIG. 24A
FIG. 24B
FIG. 24C
FIG. 24D

FIG. 26A

| 1 | 2 | 3 | 4 | 5 | 6 | 7 | 8 | 9 | 10 | 11 | 12 | 13 | 1 | 2 | 3 | 4 | 5 | 1 | 2 | 3 | 4 | 5 | 6 | 7 | 8 |
|---|---|---|---|---|---|---|---|---|---|---|---|---|---|---|---|---|---|---|---|---|---|---|---|---|---|
| A | A | A | A | A | A | A | A | A | A | A | A | A | B | B | B | B | B | C | C | C | C | C | C | C | C |

FIG. 26B

| <13> | A | <5> | B | <8> | C |
|---|---|---|---|---|---|

FIG. 26C

| A | B | C | D | E | F | G | H | I | J | K | L | M | N |
|---|---|---|---|---|---|---|---|---|---|---|---|---|---|

FIG. 33

| code 0   | 0    | 1    | 1  | 1    | 1         |
|----------|------|------|----|------|-----------|
| codegrad | —    | 0    | 1  | 1    | 1         |
| code 1   | —    | —    | 0  | 1    | 1         |
| code 2   | —    | —    | —  | 0    | 1         |
| CODE     | 0    | 1101 | 10 | 1100 | *1<br>111 |

*1) '111' + PIXEL VALUE (COLOR DATA)

FIG. 34

| k | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| d[i] | A | B | A | C | B | A | D₀ | D₁ | D₂ | D₃ | D₄ | D₅ | D₆ | A | B | A | E₀ | E₁ | E₂ |
| X | +255 | −96 | +96 | −192 | +96 | +96 | −16 | −32 | −48 | −64 | −80 | −96 | −112 | +112 | −96 | −96 | −208 | −224 | −240 |
| Y | +100 | +159 | +255 | −96 | −96 | +192 | +80 | +64 | +48 | +32 | +16 | +0 | −16 | +96 | +16 | +112 | −112 | −128 | −144 |
| grad | +1 | +1 | +1 | +1 | +1 | +1 | +16 | +16 | +16 | +16 | +16 | +16 | +16 | +16 | +16 | +16 |

DATA COMPRESSION METHOD AND APPARATUS THEREFOR

BACKGROUND OF THE INVENTION

1. Field of the Invention

The present invention relates to a data compression method and an apparatus therefor.

2. Related Background Art

These years, images created on a computer under DTP have been required to have a high quality, and multicoloring and multigradating have been progressed. The volume of data for an image of such a kind, becomes large, that is, for example, about 4M bytes are required for an image on three-color printing having 400 dpi with 256 gradation. If image data are handled as code data such as Page Description Language, the volume of data can be less, but there has been raised such problems that a long time is required for decoding code data into image data and that original code data cannot be reproduced from an developed image.

As a data compression method for a multivalued color image in general, JPEG (Joint Photographic Expert Group) has recommended using a compression method of an ADCT (Adaptive Discrete Cosine Transform) type. Explanation will be made of this ADCT compression method.

Referring to FIG. 13 which is a block diagram showing a functional arrangement of an ADCT compression apparatus, a color space converting part 3101 converts a color space (NTSC-RGB) exhibited by color signals (red (R), green (G) and blue (B)) in an NTSC system, into a color space (YCrCb) exhibited by a luminance signal Y and two color-difference signals Cr, Cb. A subsampling part 3102 reduces color-difference data with the use of such a characteristic that the human eyes are sensitive to brightness but are not sensitive to color difference. Specifically, the subsampling part 3102 obtains an averaged value of two adjacent color-difference data so as to reduce the volume of color data into a one-half. A DCT (Discrete Cosine Transform) converting part 3103 divides image data received through from the sampling part 1302, into blocks which are vertically and horizontally adjacent to one other in an 8×8 array, and them subjects the same to DCT conversion so as to convert the image data into a frequency space. A quantization part 3104 divides 64 DCT coefficients by quantized values having different step widths. A Huffman encoding part 3105 separates the thus quantized 64 DCT coefficients between one and 63, and then codes the respective coefficients with the use of a Huffman table recommended by the JPEG. The thus encoded data are affixed with a header such as quantized table data or Huffman table date, and are stored in a memory or transmitted to another device or the like.

Referring to FIG. 14 which is a block diagram illustrating the functional configuration of an ADCT expansion unit, a Huffman decoding part 3205 decodes inputted coded data so as to produce quantized data. An inverse quantization part 3204 converts the quantized data produced in the Huffman coding part 3205 into CDT coefficient data. That is, the coefficient data can be obtained by multiplying 64 coefficients quantized values with quantized values by use of quantizing table data used during the quantization in the quantization part 3104. A reverse DCT conversion part 3203 converts the DCT coefficient data obtained in the reverse quantization part 3204 into actual image data. An interpolation part 3202 interpolates data Cr and Cb which have been absent by the sampling part 3102 during data compression, by simply using the so-called iteration process. A color space converting part 3201 converts YCrCb data into NTSC-RGB data or color space data for the device thereof.

Next, explanation will be made of the flow of the operation of the above-mentioned data compression apparatus and the expansion unit by exhibiting actual data.

Figure 15:
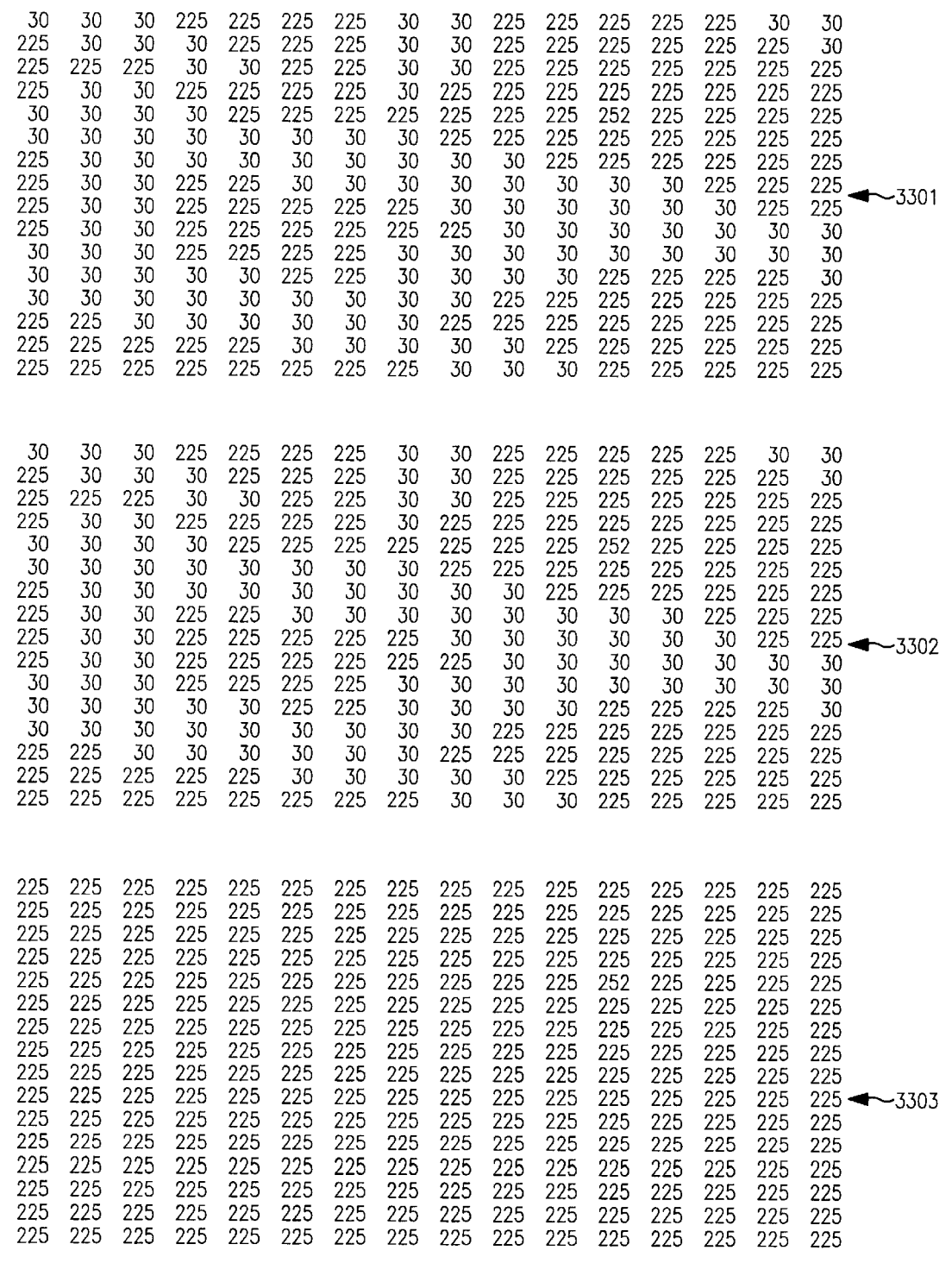

FIG. 15 shows a part of image data or a multivalued color image created by a computer. That is, the data shown in FIG. 15 are NTSC-RGB data which are a part (16×16 pixels) of an image data developed from a character part of the multivalued color image. There are shown red (R) data 3301, green (G) data 3302 and blue (B) data 3303. Data of each of the pixels has a range of 8 bits (0 to 255). Further, this part is a part of an image in which a blue color character indicated by (R, G, B)=(30, 30, 225) is written on a base indicated by (R, G, B)=(225, 225, 225) which is more or less dark.

The conversion from NTSC-RGB into YCrCb, executed by the color space conversion part 3101, is made by the following expressions.

$Y=0.299 \times R+0.587 \times G+0.114 \times B$ $Cr=0.713 (R-Y)$ $Cb=0.564 (B-Y)$ Further, by the recommendation of CCIR, the data are subjected to the following round-off (rounding) process in order to allow overshoot or undershoot during computation in the YCrCb color space.

$Y=219.0 \times Y+16.5$ $Cr=224.0 \times Cr+128.5$ $Cb=224.0 \times Cb+128.5$

YCrCb data obtained from the above-mentioned expressions are sampled for color difference data Cr, Cb in the sampling part 3102. As such a sampling process, a simple thinning process, a MAX data selecting process, a MIN data selecting process or the like can be used. However, an averaged value process will be used in this case. That is, an averaged value of data for two sequential pixels is taken so as to compress the data into a single one. In FIG. 16 which shows data having been obtained through the above-mentioned color space conversion part 3101 and the sampling part 3102, there are shown Y data (brightness data) 3401, Cr data (color difference data) 3402, and Cb data (color difference data) 3403. It is understood that each data Cr, Cb are reduced to one-half by the processing of the sampling part 3102.

Next, as shown in FIG. 16, Y data 3401, Cr data 3402 and Cb data 3403 are inputted into the DCT converting part 3103 where data are divided into blocks each having 8×8 data which are horizontally and vertically adjacent to one another. As the result of the division into the blocks, the Y data 3401 is divided into four blocks 3401a to 3401d. Similarly, the Cr data 3402 is divided into two blocks 3402a and 3402b. Similarly, the Cb data 3403 is divided into two blocks 3403a and 3403b. Further, these eight blocks are subjected to DCT conversion.

Referring to FIG. 17 which shows the result of the DCT conversion of the eight blocks shown in FIG. 8. Blocks 3501a to 3501d correspond respectively to four blocks 3401a to 3401d. Similarly, a block 3503 exhibits data obtained after the DCT conversion of the Cb data 3403. 64 coefficients of the blocks after the DCT conversion, consist of on DC component (left upper corner) and 63 AC components.

Next, the data 3501 to 3503 after the DCT conversion shown in FIG. 17 are quantized in the quantization part 3104.

A quantizing table recommended by JPEG is used as a quantizing table for the quantization carried out in this example. Referring to FIG. 22 which show the quantizing table, there are shown a table 4001 for Y components, a table 4002 for Cr components and Cb components. Data after the quantization process are shown in FIG. 18 in which there are shown post-quantization data 3601 of the Y data, post-quantization data 3602 of the Cr data and post-quantization data of the Cb data.

The respective post-quantization data 3601 to 3603 are separated into DC components and AC components in the Huffman coding part 3105. The DC components are used to obtain a histogram with respect to DC components in the previous blocks so as to create an optimum Huffman encoding table with which the encoding are carried out. The AC components are rearranged in a zig-zagging order as shown in FIG. 23. Further, for the AC components, a histogram is taken in the combination of run lengths of 0 (zero) during which a value X which is not zero is set in, and the values X so as to create an optimum Huffman table with which the encoding is carried out.

At this time, the data of 16×16 pixels in this NTSC-RGB has 795 bits. Since one pixels has 8 bits in the original image, it is resulted in 16×16×3 colors=786 bytes=6144 bits. That is, 1/7.7 of compression is made. Actually, this coded data is appended with an image size, a quantizing table, an encoding table and the like, and are stored in memory or are transmitted.

Explanation will be made of a process during expansion of data.

The image data processed by the ADCT compression process are inputted into the Huffman decoding part 3205 so as to be decoded. The inverse quantization part 3204 multiplies the data having being decoded in the Huffman decoding part 3205, with coefficients in the quantizing table shown in FIG. 22, that is, an inverse quantization process is carried out. From the above-mentioned process, data shown in FIG. 19 are obtained, that is, the data shown in FIG. 19 is obtained by carrying out the Huffman decoding process and the inverse quantization process for the data obtained by the above-mentioned ADCT compression process. It is clear that the data shown in FIG. 19 is different from the data before the compression shown in FIG. 17 in comparison therebetween.

The data shown in FIG. 19 is converted into YCrCb data in the inverse DCT conversion part 3202. FIG. 20 shows the YCrCb data. The data shown in FIG. 20 is converted into NTSC-RGB data in the color space conversion part 3201. FIG. 21 shows data which is finally obtained by the data expansion process.

As mentioned above, the above-mentioned ADCT compression process is an irreversible compression process accompanied with a loss of data during quantization. It is clear in comparison of FIG. 15 showing the NTSC-RGB data after the compression process, with the NTSC-RGB data shown in FIG. 21 which are resulted from the execution of the compression and expansion process for the data shown in FIG. 15. Thus, it is found that the image quality deteriorates.

An image created on a computer (a computer created image), such as DTP (desk top publishing) data, has advantages in that the outline is clear, and no-noise color-painting with a unicolor for a single pattern (or a character) can be made. However, if image data is processed by the ADCT compression process, disorder in the outline of a pattern, pseudo-edge (so-called mosquito noise), discoloration caused by quantization or the like occur, and accordingly, the advantages obtained by the computer created image cannot be demonstrated. In particular, since the above-mentioned compression process is a 8×8 block process, the color greatly varies in the boundary zone. If the compression rate is increased, the AC components are finally lost, resulting in occurrence of block distortion, and accordingly, an image having a resolution decreased to ⅛ is obtained.

Accordingly, although a compression process in which the compression is made by restraining the quantization to a degree at which the deterioration of the image is invisible, may be used, but it is not practicable in the compression rate since the computer created image originally has a feature that it has a large volume of high frequency data. Accordingly, it is required for a computer created image obtained by the DTP that the compression is made by a compression process in which a reversible high compression rate can be obtained.

Meanwhile, as to the reversible compression process, a run length compression process in which the length in which the same data are successive, is compressed may be used. For example, in a run length compression process for multivalued image data, a Huffman code which indicates that how many numbers of the same pixels succeed is appended with the pixel data thereof, next thereto. Such a compression can attain a relatively large compression rate as shown in FIG. 26B by appending data A after a Huffman code indicating 13, and data B after a Huffman code indicating 5, and data C to a Huffman code indicating 8 when a classical computer created image is processed as shown in FIG. 26B.

However, in the case of an image shown in FIG. 26C in which data successively change, since a Huffman code indicating 1 is appended thereafter with data A, a Huffman code indicating 1 thereafter with data B, a Huffman code indicating 1 thereafter with data C . . . , the data size become larger than that of "ABC . . . " which are, as a result, the same as original image data, and accordingly, the data sometime expand, rather than data compression.

SUMMARY OF THE INVENTION

The present invention has been devised in view of the above-mentioned circumstances, and accordingly, one object of the present invention is to provide a method of and an apparatus for effectively compressing data.

In order to achieve the above-mentioned object, according to the present invention, there is provided a data compression apparatus comprising:

input means for serially inputting multi-level data;

means for detecting a differential value between two consecutively inputted multi-level data;

first detecting means for determining whether a first differential value detected by said detecting means is zero or not;

first memory means for storing therein a value based upon the first differential value when the first differential value is not zero;

second determining means for determining whether a second differential value detected by the detecting means coincides with the value stored in the first memory means, and output means for outputting encoded multi-level data in accordance with a result of the determination by the first and second determining means.

Further, another object of the present invention is to provide an image data compression and expansion method of and an apparatus for compressing a multi-valued image created by a computer or the like, at a high compression rate.

In order to achieve the above-mentioned object, according to the present invention, there is provided an image data compression apparatus comprising:

pixel input means for inputting pixel data d[i] one pixel by one pixel, subtracting means for calculating a differential value diff between a present pixel d[i] and a one-before pixel d[i−1];

determining means for determining whether the differential value diff is zero or not;

a number m of holding means for holding vectors vect[n] (n=0 to m) having high occurability;

a number m of comparing means for comparing the vectors vect[n] with the differential value diff;

computing means for computing the vectors vect[n];

code output means for determining a compression code in accordance with results given by the determining means and the comparing means, and for outputting the compression code.

Further, another object of the present invention is to provide a novel reversible compression method.

Further, another object of the present invention is to speed up a compression and expansion process.

Further, another object of the present invention is to efficiently compress a halftone image (including a gradation).

The other objects and configurations of the present invention will be apparent from the following description with reference to the drawings and the appended claims.

BRIEF DESCRIPTION OF THE DRAWINGS

FIG. 1 is a view illustrating a whole system of a compression apparatus in a first embodiment of the present invention;

FIG. 3 is a view illustrating a whole system of an expansion apparatus in the first embodiment of the present invention;

FIGS. 10A and 10B are view illustrating a compression apparatus system in a fifth embodiment of the present invention;

FIGS. 12A and 12B are views illustrating variations in information X', Y' in the sixth embodiment;

FIG. 15 is a view for explaining an ADCT compression process in a conventional technique;

Figure 16A:
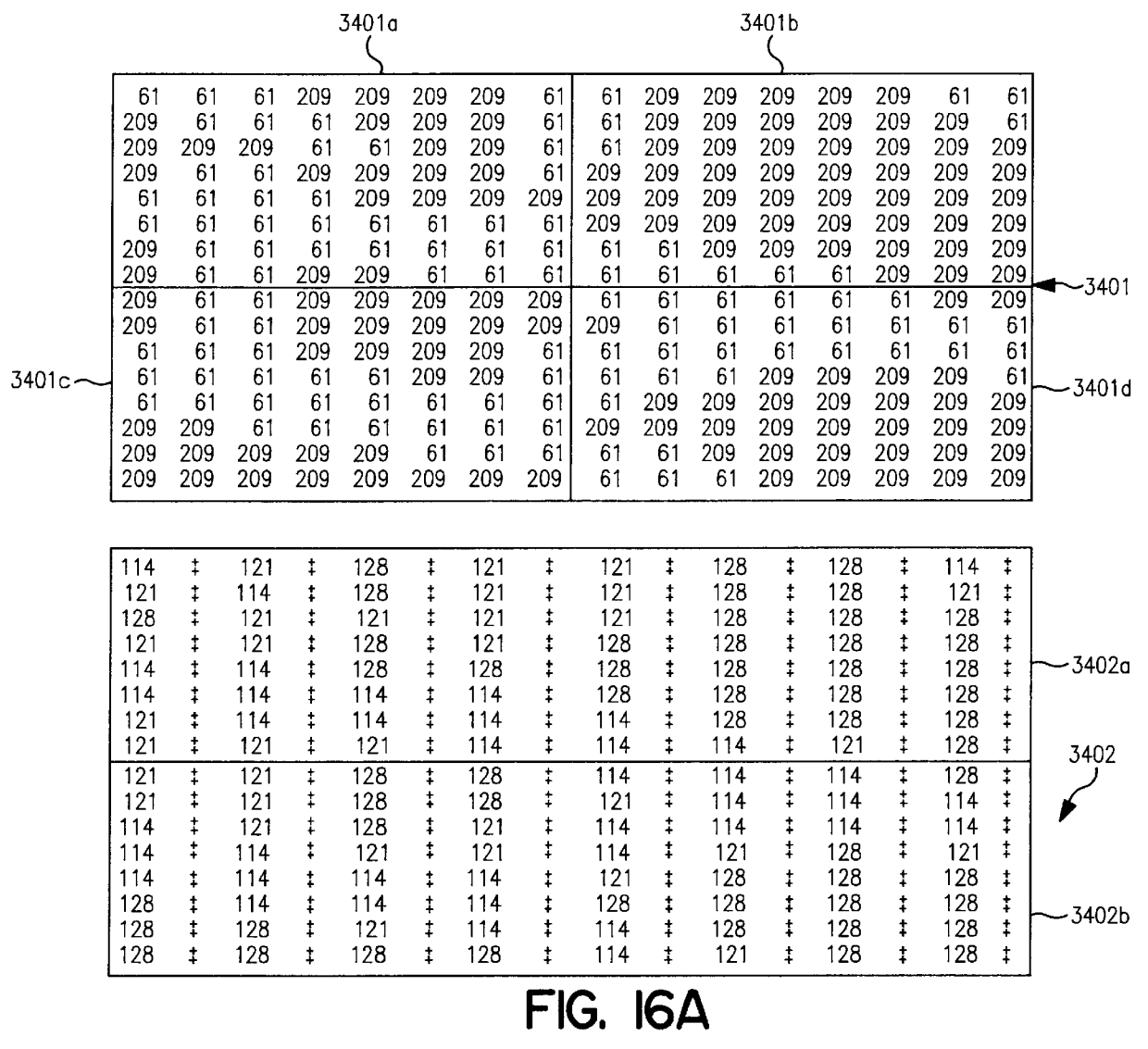

FIGS. 16A and 16B are views for explaining an ADCT compression process in a conventional technique;

FIGS. 17A and 17B are views for explaining an ADCT compression process in a conventional technique;

FIGS. 18A and 18B are views for explaining an ADCT compression process in a conventional technique;

FIGS. 19A and 19B are views for explaining an ADCT compression process in a conventional technique;

FIGS. 20A and 20B are views for explaining an ADCT compression process in a conventional technique;

Figure 21:
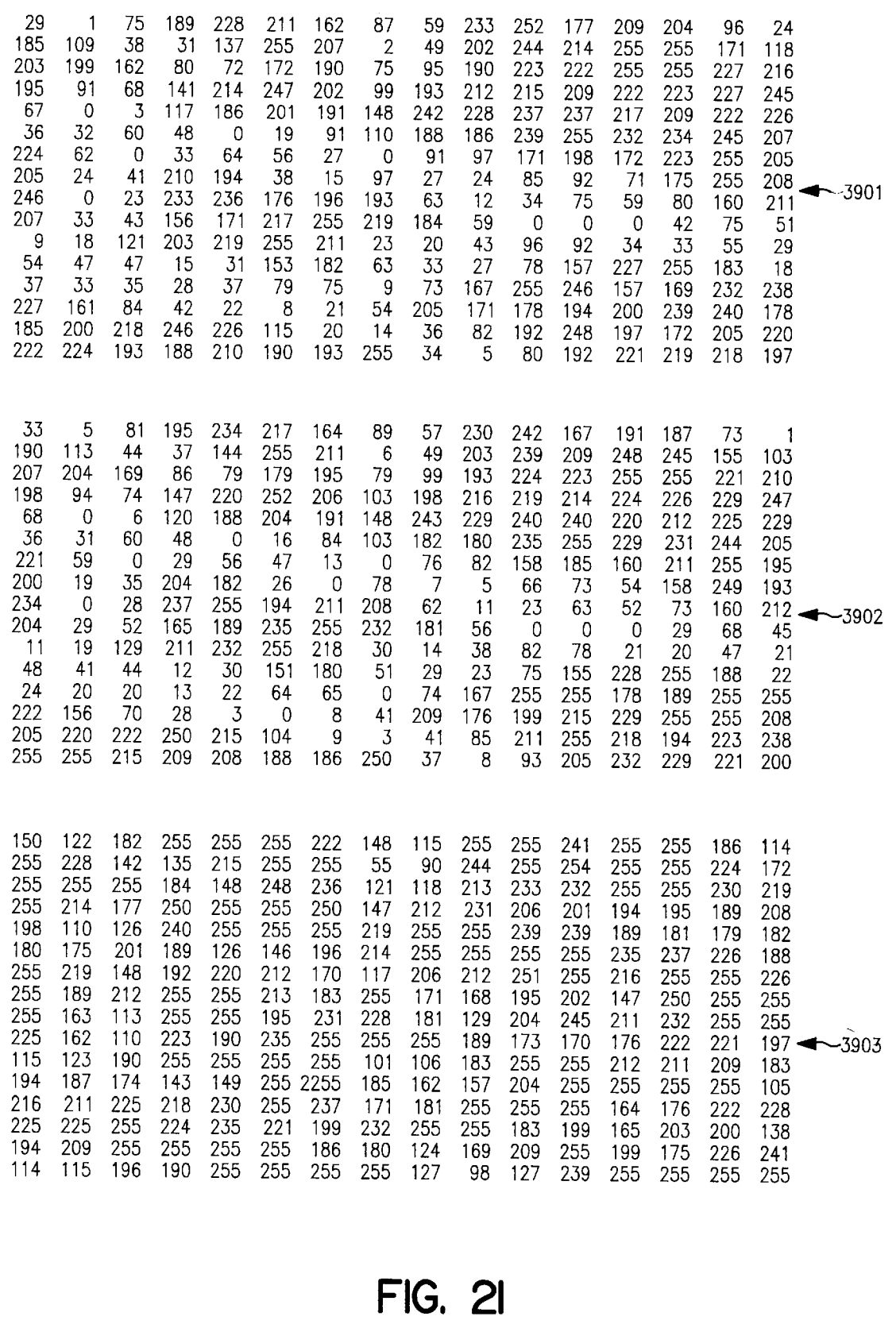

FIG. 21 is a view for explaining an ADCT compression process in a conventional technique;

FIGS. 24A to 24D are views showing a typical computer created image, situations of variation in vectors X, Y and compression data.

FIGS. 26A to 26C are views illustrating an example of a run length compression process for multi-valued image data.

FIG. 33 is an example of the relationship between events (cases) and codes;

FIG. 34 is a view showing an example of a computer created image and an example of encoding in a variant form;

DESCRIPTION OF THE PREFERRED EMBODIMENTS

Figure 2:
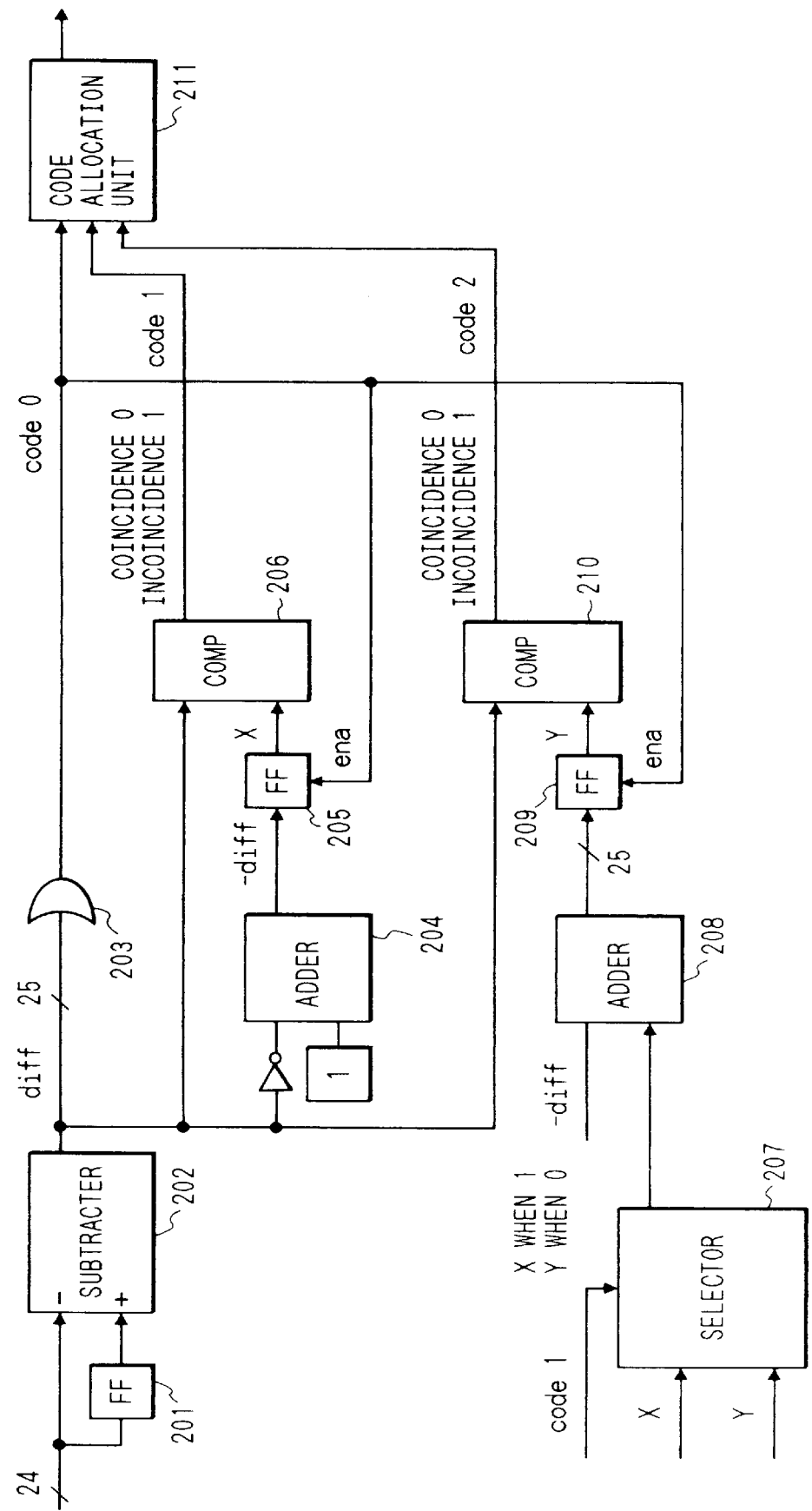
FIG. 2 is a detailed view illustrating the compression apparatus.

At first, FIG. 24A shows features of a computer created image, in which the ordinate exhibits values of data, and the abscissa is a spacial axis. The computer created image has a tendency in which the same data are consecutive as a first feature, and a tendency data are returned to its original data even though it is converted.

Accordingly, as to the level of the occurrence probability, the following events possibly occur:

1) the same data as previous data (differential value is zero); and 2) a vector reverse to a vector upon variation in a pixel value.

That is, if a variation of plus 2 in the differential value occurs, a variation of minus 2 possibly occurs. This fact will be explained with reference to FIG. 24B.

If a vector of plus 2 occurs at 1104, a vector which possibly occurs next to a differential value <0> is <−64>. In the example shown in FIG. 24, A vector of minus 64 occurs at the next 1102. A vector which possibly occurs next to the vector of minus 64 at 1102 is <+64>. That is, the vector of plus 64 occurs at 1103. A vector of plus 191 occurs at the next 1104. In this state, an event which possibly occurs next to <0> is <−191>, and then, is <−255> obtained by a calculation of −191 −64.

In view of the above-mentioned features, an event which possibly occurs can be expressed by the following calculation formula. Denoting that a spacial variation is i, a pixel value at that time is d[i] (8 bits from 1 to 255), a value which is incrementally increased in a block of the same color is k (refer to FIGS. 24A to 24D), a vector which possibly occurs next to <0> is x[k], and a vector which occurs next to <0>, x[k] is y[k], if diff=d[i]−d[i−1] is set, x[k] and y[k] do not vary when diff is zero. When diff is other than zero, x[k] and y[k] are updated as follows:

x[k+1]=−diff, y[k+1]=diff+A[k]

where A[k] becomes y[k] when an occurring vector coincides with x[k], but becomes x[k] except that time.

i[0], x[0] and y[0] are substituted thereinto with given values as initial values. For example, i[0]=0, x[0]=255, y[0]=100 are substituted.

Further, by allocating short codes to events which are possibly occur, the data can be compressed.

For example, a code "0" as the differential value is 0, a code "10" as the differential value coincides with x[k], and a code "110" as the differential value coincides with y[k] are set, and if the differential value does not coincide with any one, a code "111" indicating that it does not coincide with any one, is appended with data indicating a value. Although the data indicating a value are either a differential value or color data, color data are appended in this example. With the use of these codes, an image having values which vary as shown in FIG. 24B will be processed.

As d[1]−d[0] is zero, <0> is outputted.

As d[2]−d[1] is also zero, <0> is outputted.

As d[3]−d[2] is 64, and accordingly, is different from x[0]=10 and y[0]=5, <111+64> or <11101000000> is outputted.

With this variation, −64 (−diff) is substituted into x[1] and 191 (−diff+x[0]) is substituted into y[1].

As d[4]−d[3] is zero, <0> is outputted.

As d[5]−d[4] is also zero, <0> is outputted.

As d[6]−d[5] is −64 so as to coincide with x[1], <10> is outputted.

With this variation, +64 (−diff) is substituted into x[2], and 255 (−diff+y[1]) is substituted into y[2].

As d[7]−d[6] is zero, <0> is outputted.

As d[8]−d[7] is −64 so as to coincide with x[2], <10> is outputted.

With this variation, −64 (−diff) is substituted into x[3] and 191 (−diff+y[2]) is substituted into y[3].

As d[9]−d[8] is zero, <0> is outputted.

As d[10]−d[9] is +191 so as to coincide with x[3], <110> is outputted.

With this variation, −191 (−diff) is substituted into x[4] and −255 (−diff+x[3]) is substituted into y[4].

As d[11]−d[10] is zero, <0> is outputted.

As d[12]−d[11] is also zero, <0> is outputted.

As d[13]−d[12] is also zero, <0> is outputted.

As d[14]−d[13] is also zero, <0> is outputted.

As d[15]−d[14] is also zero, <0> is outputted.

As d[16]−d[15] is also zero, <0> is outputted.

As d[17]−d[16] is −191 so as to coincide with x[4], <10> is outputted.

With this variation, +191 (−diff) is substituted into x[5] and −64 (−diff+x[4]) is substituted into y[5].

With this process, the values x[k] and y[k] vary as shown in FIG. 24C. Further, they have 59 bits as shown in FIG. 24D showing code data, and accordingly, in this example, data which has required 36 pixels×8=288 bits since original data has 8 bits can be compressed to 59 bits which is ⅕. This can be applied to an image having any bits.

A situation in which the data shown in FIG. 24D is expanded will be hereinbelow explained.

Even during an expansion process, initial values d[0]=0, x[0]=255, y[0]=100 which are the same as those during the compression process are given.

At first, as the first code is <0>, d[1]=d[0]=0 can be obtained.

As the next code is also <0>, d[2]=0 can be obtained.

As the next code is <111> so as to exhibit that data having a differential value which is different from either x[0] or y[0] occurs, the next 8 bits (although data have 8 bits in this case, it has 24 bits if its original data have 24 bits) are read out so as to obtain a numerical value 64 which is then substituted into d[3], that is, d[3]=64. In this state, −(d[3]−d[2])=−64 is substituted into x[1], and −64+x[0]=191 is substituted into y[1]. Since in this example, the color data are appended, although d[3]=(read-out numerical value), and x[1]=− ((read-out numerical value)−d[2]) are obtained, x[1]=(read-out numerical value) is obtained with d[3]=d[2]+(read-out numerical value) if a differential value is appended.

As the next code is also <0>, d[4]=64 can be obtained.

As the next code is also <0>, d[5]=64 can be obtained.

As the next code is <10> so as to exhibit that the differential value is equal to x[1], d[6]=d[5]+x[1]=0 can be obtained. In this state, −(d[6]−d[5])=64 is substituted into x[2], and 64+y[1]=255 is substituted into y[2].

As the next code is also <0>, d[7]=0 can be obtained.

As the next code is <10> so as to exhibit that the differential value is equal to x[2], d[8]=d[7]+x[2]=64 can be obtained. In this state, −(d[8]−d[7])=−64 is substituted into x[3], and −64+y[2]=191 is substituted into y[3].

As the next code is also <0>, d[9]=64 can be obtained.

As the next code is <110> so as to exhibit that the differential value is equal to y[3], d[10]=d[9]+y[3]=255 can be obtained. In this state, −(d[10]−d[9])=191 is substituted into x[4], and −191+x[3]=−255 is substituted into y[4].

With the above-mentioned process, image data shown in FIG. 24A can be obtained from codes shown in FIG. 24D with no data loss.

Next, explanation will be hereinbelow made of preferred embodiments of the present invention with reference to the accompanying drawings.

Embodiment 1

Figure 25A:
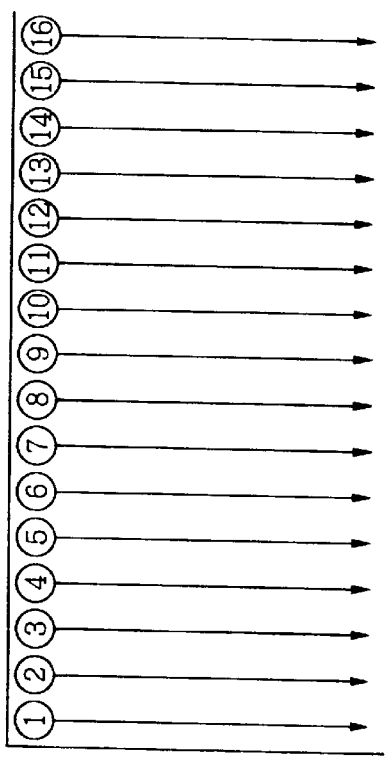
FIGS. 25A to 25C are views showing an example of rearrangement carried out in a pixel data rearrangement part.
Figure 25B:
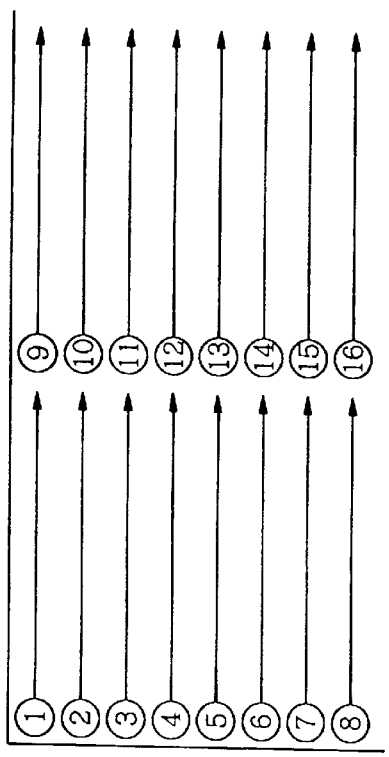
Figure 25C:
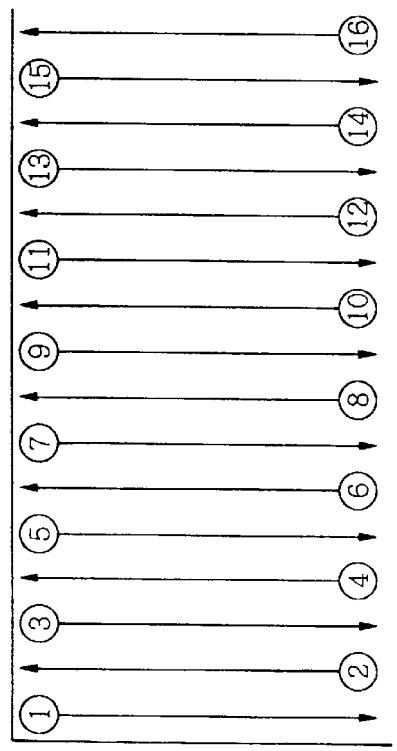

Referring to FIG. 1 which is a block diagram illustrating a functional arrangement of a data compression apparatus in an embodiment 1, a pixel data rearrangement part 101 rearranges inputted raster image data, and delivers one pixel by one pixel in synchronization with a clock. In this case, it does not matter even though no process is carried out (the raster can be outputted directly therethrough as it is) or the scan is successively changed as shown in FIGS. 25A to 25C, and is then outputted. For example, in order to rearrange as shown in FIG. 25A, the pixel data rearrangement part is composed of memory so as to hold pixel data for eight vertical lines, and rearranged data are successively outputted under address control. A compression part 102 compresses pixel data outputted from the pixel data rearrangement part 101 and outputs codes. A data pack part 103 inputs codes outputted from the compression part 102, so as to pack the codes in accordance with a data depth of a memory or a communication interface, and outputs packed data. A memory or a communication interface part 104 stores or transmits the packed data.

Explanation will be made of the compression part 102 with reference to FIG. 2. In FIG. 2, a flip-flop 201 with 24 bits stores therein a pixel data value inputted in synchronization with the clock. It is estimated here that the pixel data value has 24 bits, for example, RGB respectively having 8 bits. An initial value is here required, and accordingly, for example, white (255, 255, 255) is stored as an initial value into the flip-flop part 201.

A subtractor 202 inputs a pixel data d[i] and a one-before pixel data d[i-1] outputted from the flip-flop part 201, and computes d[i]-d[i-1] so as to output differential data diff having 25 bits.

An OR circuit part 203 inputs the lower order 24 bits of diff which is an output of the subtractor 202, and logic OR is taken for all so as to output a code 0 having one bit data. The code zero becomes 0 when diff is zero, but becomes 1 if diff is other than 0. It becomes zero if consecutively inputted pixel data values are equal to one another, but becomes 1 if it is not.

An adder 204 inputs NOT of diff outputted from the subtractor 202, and adds 1 to the same so as to output –diff.

A flip-flop 205 having 25 bits inputs –diff outputted from an adder 204, and stores –diff when the code 0 outputted from the NOT circuit 203 and used as a high enable signal is 1. An initial value is required so that a differential value (–255, –255, –255) which is obtained when white is turned into black is stored here. A comparator 206 inputs the diff outputted from the subtractor 202 and X outputted from the flip-flop 205, and outputs a code 1 having 1 bit data, which is 1 when they are coincident with each other but is 0 when they are not coincident with each other.

A selector 207 inputs X which is outputted from the flip-flop 205, and Y which will be explained hereinbelow, and selects and outputs X when code 1 is 1, but selects and outputs Y when the code 1 is zero under the control of code 1 outputted from the comparator 205.

An adder 208 inputs –diff outputted from the adder 204 and an output from the selector 207, and outputs an added result having 25 bits.

A flip-flop 209 having a 25 bits inputs an output from the adder 208 and stores data when code 0 which is outputted from the NOT circuit 203 and which is used as a high enable signal is 1. An initial value is required, and a differential value (0, –255, –255) which is obtained when white is turned into red is stored as the initial value.

A comparing part 210 inputs diff outputted from the subtractor 202 and Y outputted from the flip-flop 209, and outputs a code 2 having 1 bit data which is 0 when they are coincident with each other, but which is 1 when they are not coincident with each other.

A code allocating part 211 inputs code 0, code 1 and code 2, allocates codes thereto, and thereafter outputs them.

In this compression apparatus, the following four cases are present:
1) the differential value diff is zero;
2) the differential value diff coincides with X;
3) the differential value diff coincides with Y; and
4) it is other than any of 1), 2) and 3).

For example, if code <0> is fixed to 1), <10> to 2), <110> to 3) and <111> to 4), <code 0> may be outputted in the case 1), <code 1, code 1> in the case 2), <code 0, code 1, code 2> in the cases 3) and 4), and accordingly the code allocating part 211 is not required. The code allocating part 211 is required if it is desired that the code is adaptively changed in dependence upon a situation (such as a feature of image data).

Figure 6:
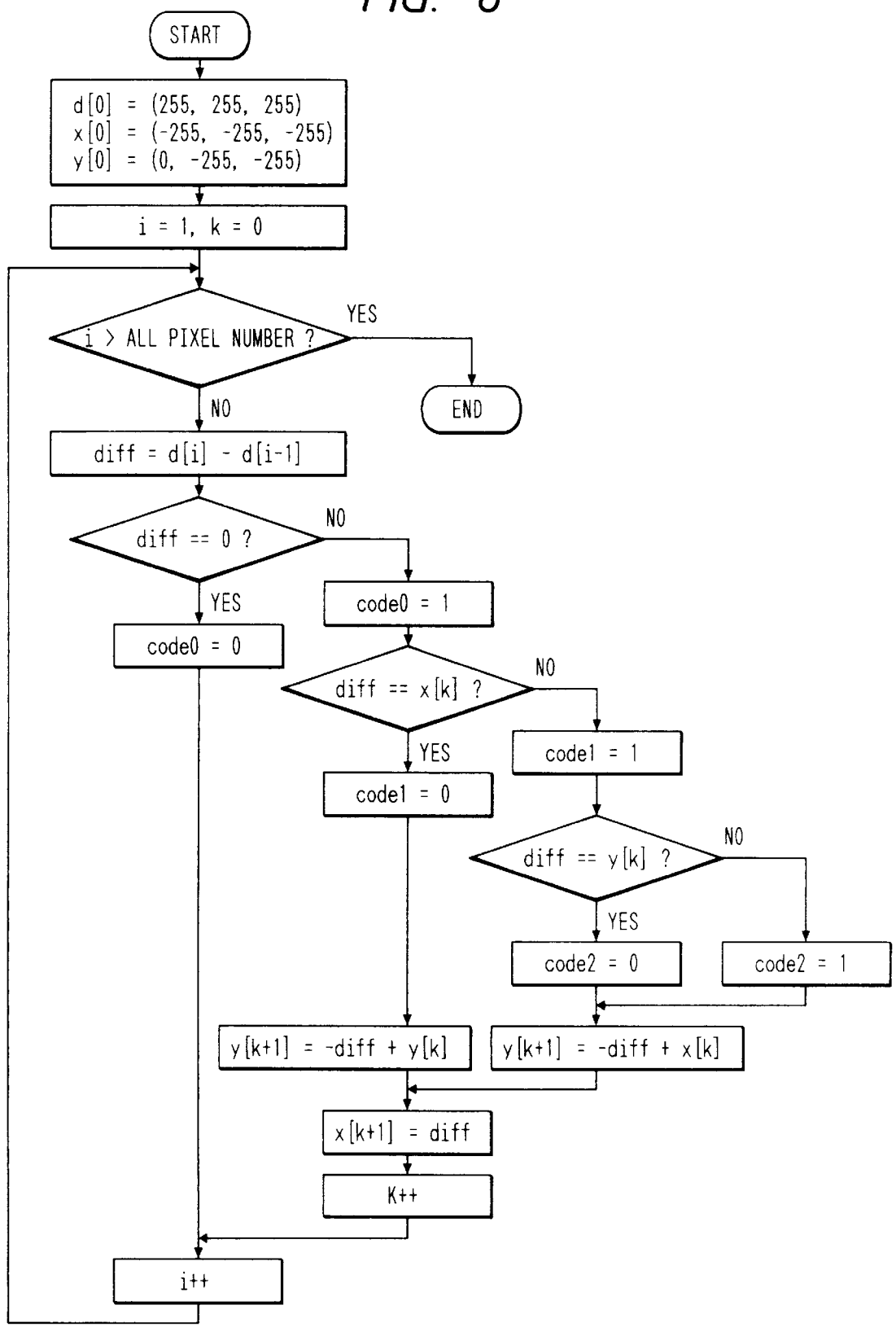
FIG. 6 is a flow-chart showing the operation of the compression apparatus shown in FIG. 2.

FIG. 6 is a flow-chart in such a case that the algorithm of the compression apparatus in this embodiment is realized by a software.

FIG. 3 shows an example of an expansion apparatus for expanding data compressed by the compression apparatus.

A memory or a communication interface 301 outputs read-out data or received data. A data unpack part 302 composed of a multiplexer or the like, unpacks received compression data and then outputs the same. A pixel data rearrangement part 304 converts the data expanded by the pixel data rearrangement part into a two-dimensional space (horizontal and vertical directions), and outputs the same. This is not required in such a case that the rearrangement part 101 for rearranging pixel data upon compression is not present. For example, the data are rearranged as shown in FIGS. 25A to 25C, it is required in order to return the data into the original raster order.

Figure 4:
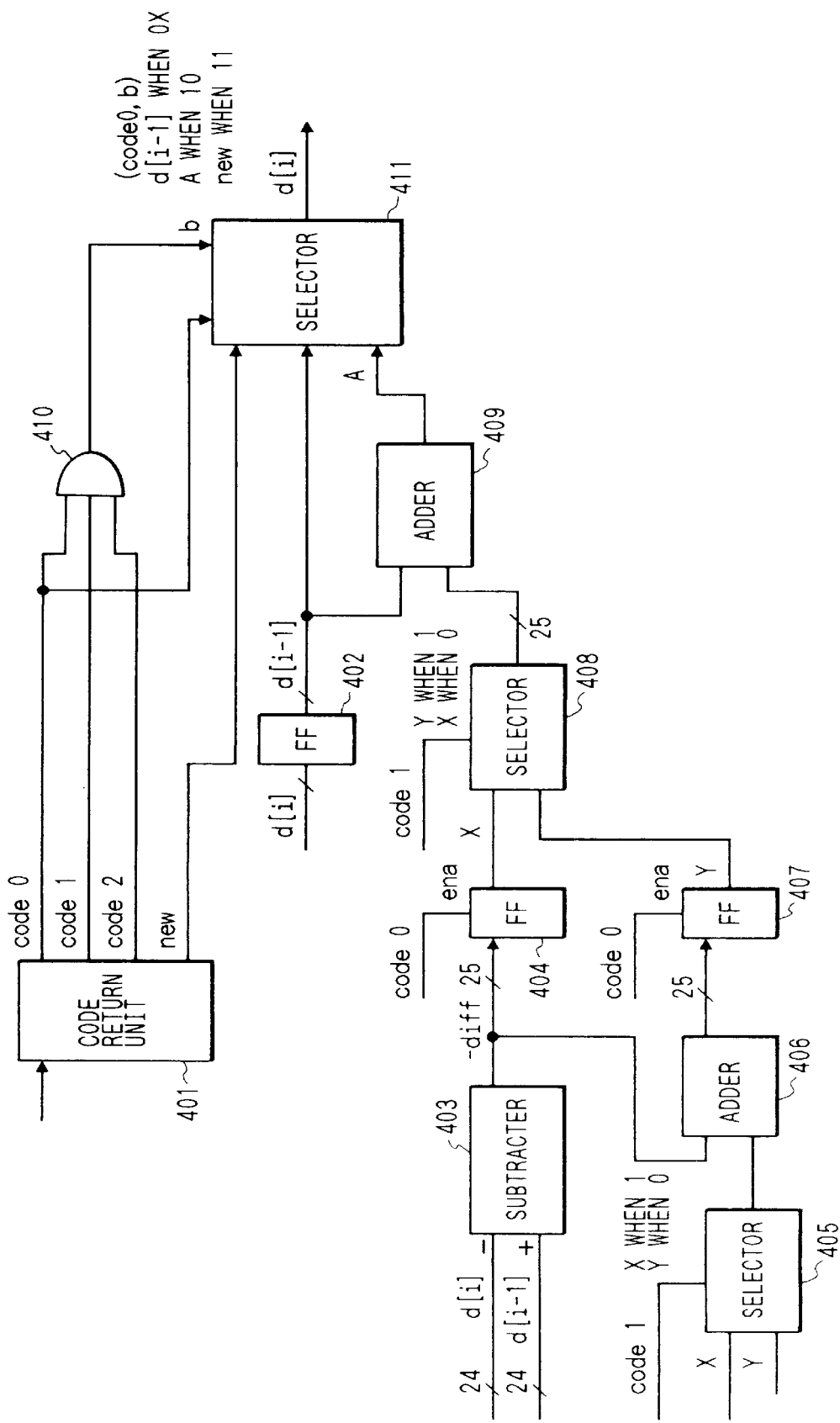
FIG. 4 is a detailed view illustrating the expansion apparatus.

The expansion part 303 will be explained with reference to FIG. 4. A code return part 401 is required if the code conversion is carried out in the code allocating part upon compression, but is not required if it is not. It outputs color data new having 24 bits appended with code 0, code 1 and code 2.

A flip-flop having 24 bits stores therein a pixel data d[1]. An initial value which is the same as that stored in 201 upon compression, is required, that is, its stores (255, 255, 255).

An subtractor 403 outputs –diff having 25 bits which is a value obtained by subtracting the pixel data d[i] from d[i-1].

A flip-flop 404 having 25 bits inputs –diff outputted from the subtractor 403, and stores –diff if code 1 when code which is used as a high enable signal is 1. Upon compression, an initial value which is the same as that stored in 205, and accordingly, (–255, –255, –255) is stored.

A selector 405 inputs X and Y which will be hereinbelow explained, and selects and outputs X when code 1 is 1 but Y when code 1 is 0 under the control of code 1.

An adder 406 outputs from the selector 405 and –diff outputted from the subtractor 403, adding them together, and delivers the result.

A flip-flop 407 having 25 bits inputs an output from the adder 406, and stores data when code 1 which is used as a high enable signal is 1. An initial value which is the same as that stored in 209 upon compression is required, and accordingly, (0, –255, –255) is stored.

A selector 408 inputs X outputted from the flip-flop 404 and Y outputted from the flip-flop 407, and selects and outputs X when code 1 is 0 but Y when code 1 is 1 under the control of code 1.

An adder 409 inputs d[i-1] outputted from the flip-flop 402 and an output from the selector 408, adding them, and outputs data A having 24 bits.

An AND circuit 410 inputs code 0, code 1 and code 2, and outputs 1 only when all are 1.

A selector 411 inputs color data new, d[i−1] outputted from the flip-flop 402 and the output A from the adder 409, and, under the control of code 0 and an output b from the AND circuit, that is, (code 0, b), selects d[i−1] at (1, X), A at (1, 0) or new at (1, 1) so as to output color data d[i].

Figure 7:
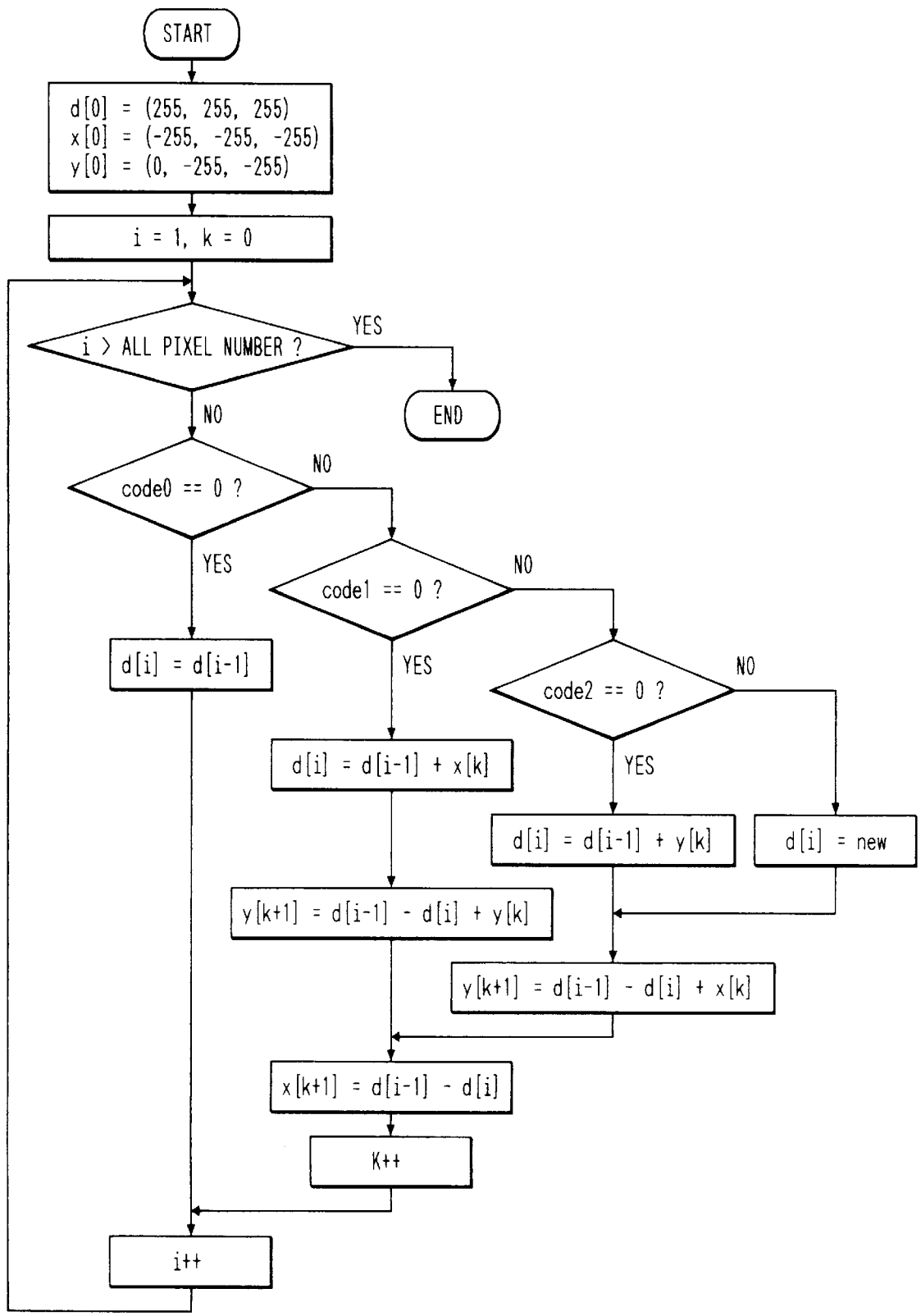
FIG. 7 is a flow-chart showing the operation of the expansion apparatus shown in FIG. 4.

FIG. 7 is a flow-chart showing the operation of the expansion apparatus.

Embodiment 2

In the above-mentioned embodiment, although explanation has been made such that two vectors x, y for which codes are given are used. However, it should not be limited to this embodiment, but any number of vectors are theoretically used. The calculating formula for the vectors are as follows. The vectors which are exhibited as x[k], y[k] in the above-mentioned embodiment, are exhibited as vect[m] [k] in this embodiment, where m=0 to n. If m=0, it corresponds to x in the above-mentioned embodiment, and if m=1, it corresponds to y in the above-mentioned embodiment. k is a value which is increased incrementally in a block of the same color (refer to FIG. 24A). Color variation is defined as diff=d[i]d[i−1] (where i is a spacial variation in pixel, and d[i] is a pixel value at a position i), and the vect [m] [k] is updated as follows when diff=0.

vect [0][k+1]=−diff;
vect [1][k+1]=−diff+A;
where if(diff==vect [0][k]), A=vect [1][k]:
else A=vect[0][k];
vect[2][k+1]=−diff+B;
where if ((diff==vect [0][k])::(diff=vect[1][k])), B=vect [2][k];
else A=vect[1][k];
vect[n][k+1]=−diff+P;
where if((diff==vect[0][k])::(diff==vect[1][k]):: . . . ::(diff==vect[n−1] [k]),
P=vect[n] [k];
else P=vect[n−1] [k].

Figure 5:
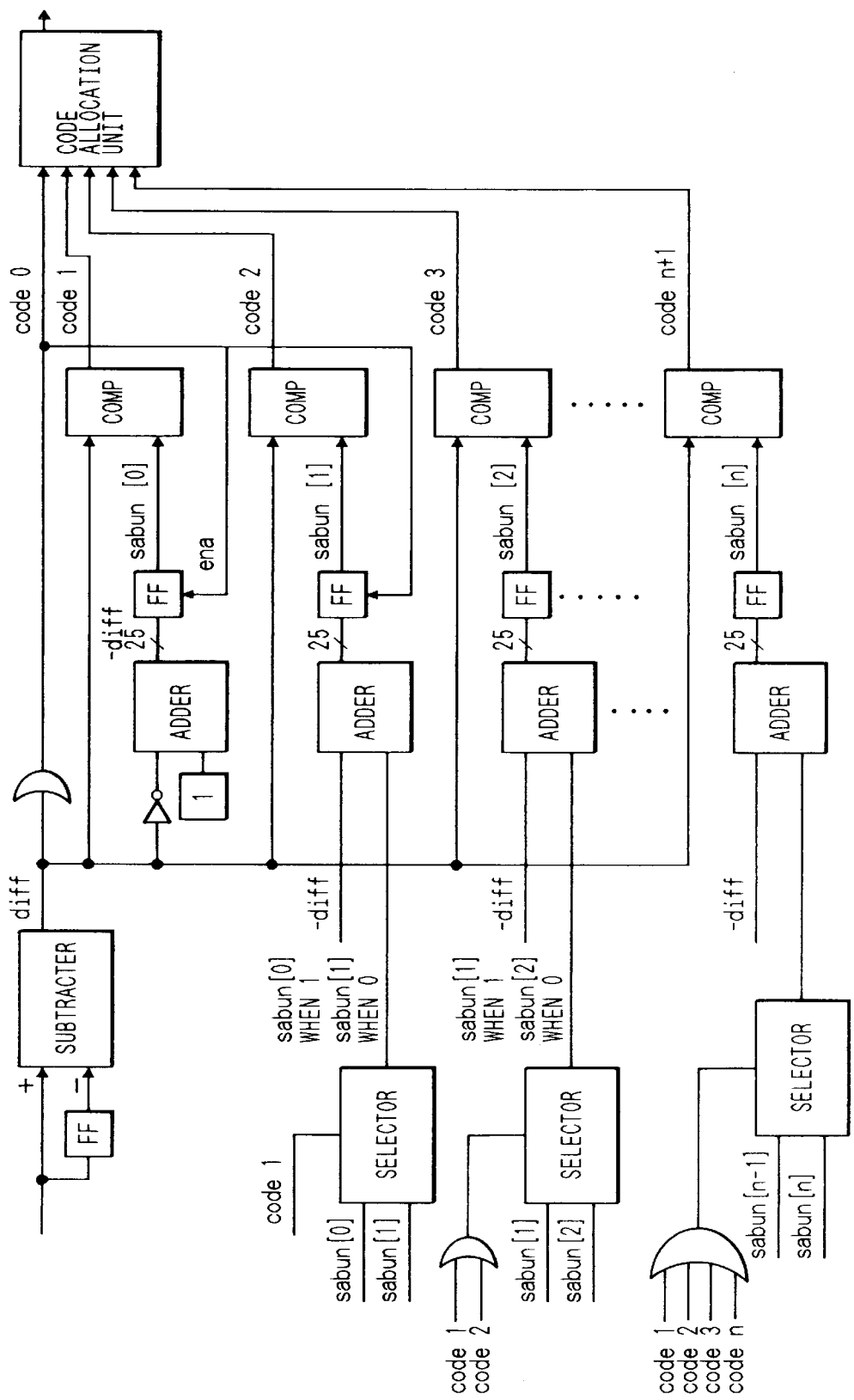
FIG. 5 is a detailed view illustrating a compression apparatus in a second embodiment of the present invention.

FIG. 5 shows an example of an apparatus which carries out the operation of this embodiment.

It is noted that although the compression process is carried out by hardware shown in FIGS. 1 to 5 in the above-mentioned embodiments, it can be carried out by software in a computer, as shown in FIG. 6.

Embodiment 3

In the above-mentioned embodiments, although explanation has been made such that color data is appended after a code which does not coincide with any vector, if it does not coincide with any vector, it should not be limited to such a case, but any information which indicates a color may be appended thereafter.

For example, differential data may be appended, or a pallet code may be appended. Explanation will be hereinbelow explained briefly.

In the case of appending a fixed bit pallet information, if an 8 bit fixed pallet is used, it is limited to 255 colors. However, it is advantageous that only 8 bits can be appended in comparison with such a case that color data having 24 bits are appended. If existing colors are known, a pallet can be initially determined, or colors occurring during compression can be registered. In this case, if it does not coincide with any vector, the registered colors in the pallet are compared with color data to be appended, and if it coincides, the number of the pallet is given but if it does not coincide, the number of a new pallet is given, and the number of that pallet is outputted.

Embodiment 4

Figure 8:
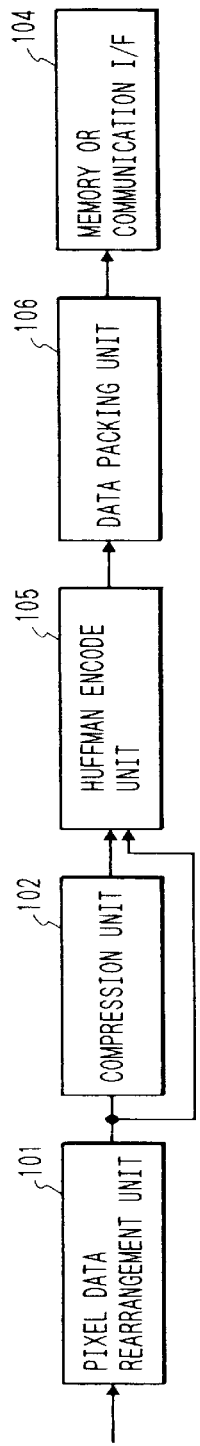
FIG. 8 is a view illustrating a compression apparatus system in a third embodiment of the present invention.

In the above-mentioned embodiment, a compression code outputted from the compression part 102 may be further compressed by another reversible compression process. As another compression process, for example, a run length compression process, an MH or a Huffman encoding process can be used. It is effective if a Huffman encoding is made by using a number in which 0 follows one after another before a numerical value 1 as a unit (for example, 00001, 00000000001), rather than a normal MH. FIG. 8 shows an apparatus in this embodiment.

Referring to FIG. 8, 101, 102 and 104 are similar to those shown in FIG. 1, and accordingly, the explanation thereof will be omitted. A Huffman encoding part 105 carries out Huffman encoding for a compression code outputted from the compression part 102. A data pack part 106 packs a Huffman code outputted from the Huffman encoding part 105, into a configuration suitable for storage in memory or transmission.

Embodiment 5

In the above-mentioned embodiment, although explanation has been made such that the compression data are serially arranged, and are packed into one, the compression data can be separately packed.

For example, explanation will be made with reference to, for example, the embodiment 1, information which correspond respectively to code 1, code 2 and code 3, and an information indicating a color to be appended therewith are respectively stored in memories 1 to 4 (901 in FIG. 9).

In such a case that the information are packed into one, a position where code data are stored, is not fixed (as an example, if the data are packed into one, having a depth of 32 bits, since code 0, code 1 and code 2 have variable code lengths, it is stored from the first bit or from the fifth bit), and accordingly, a parallel shifter is required so that the packing circuit becomes larger. This disadvantage can be eliminated by respectively packing the data. In particular, since it is difficult to pack data for 24 bits color, code 0, code 1 and code 2 may be stored together into the memory 1 while only 24 bit color data are stored in the memory 2 (902 in FIG. 9).

Further, by respectively packing code 0, code 1, and code 2, these code data can follow zero with a high possibility in such a case that they are subjected to the run length compression, thereby it is possible to enhance the effect of the run length compression. Accordingly, it is effective to provide a run length encoding part before the memories 1 to 3 (901) or the memory 1 (902).

Embodiment 6

In the above-mentioned embodiment 4, if the memories are respectively provided for code 0, code 1, code 3 and color data, since the effect of the compression is high if the same data follow one after another, irrespective of 0 or 1, in the case of subjecting to the code data to the run length compression, the codes indicating code 0, code 1 and code 2 may be toggled by use of the code allocating part 211.

FIG. 10A shows codes along with the embodiment 1. If these are turned into toggle codes, a result shown in FIG. 10B can be obtained. That is, starting from 1 occurring in FIG. 10A, the next code is inverted. Accordingly, 0 or 1 follows one after another with a high possibility. In particular, it is effective if the run length encoding is made after code 0.

Figure 11:
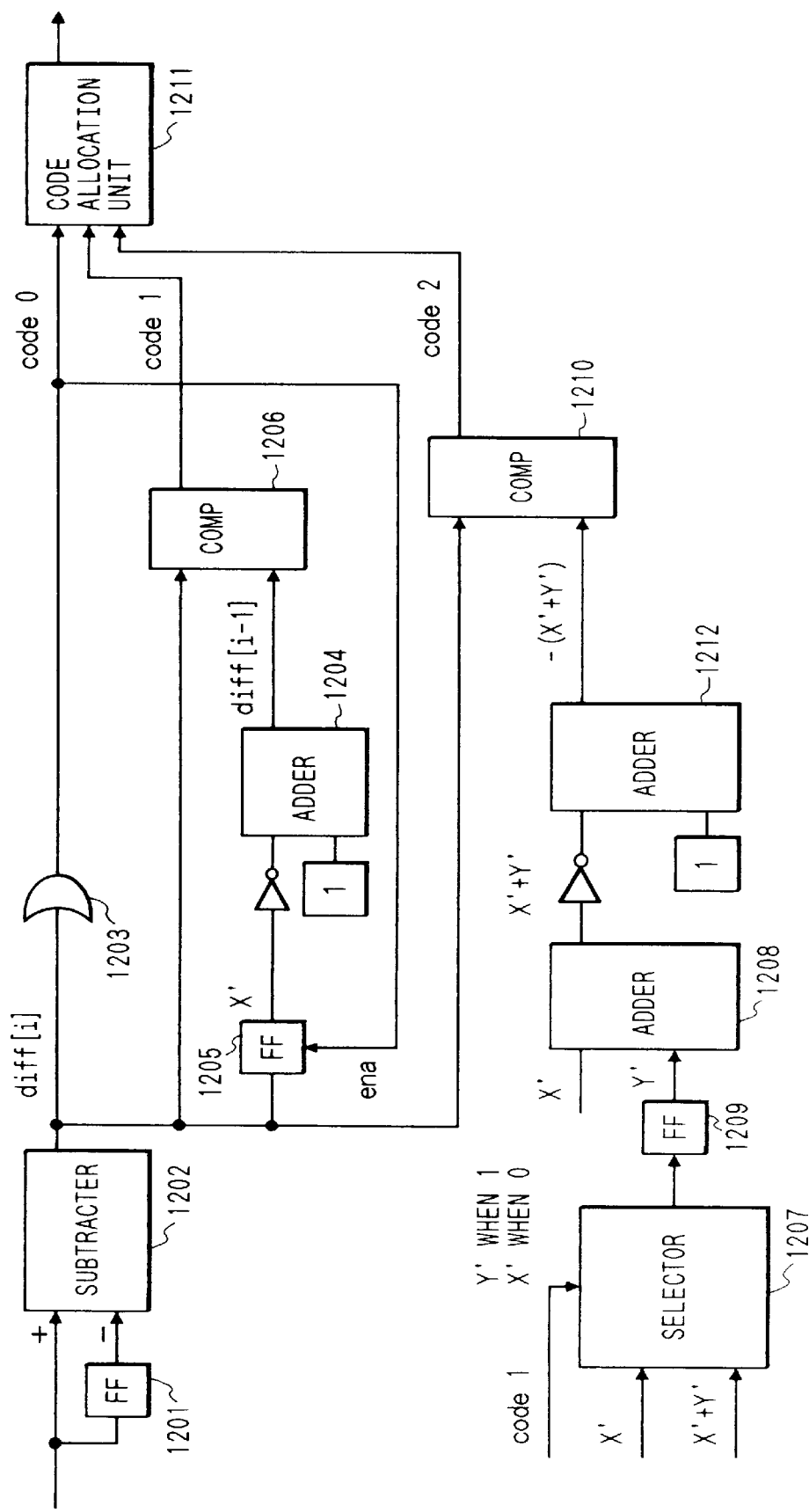
FIG. 11 is a detailed view illustrating a compression apparatus in a sixth embodiment of the present invention.

In the above-mentioned embodiment, explanation has been made such that the values of vectors having a high occurability themselves are stored in the flip-flops 206, 207, the arrangement as shown in FIG. 11 is also possible. Those corresponding to FIG. 2, are indicated by adding a number 1000 to 206 shown in FIG. 2, that is, it is indicated as 1206. It is noted here that the flip-flops 1206, 1210 do not store therein vectors having a high occurability of themselves, but store information with which vectors having a high occurability can be computed by computing parts 1204, 1208.

FIGS. 12A and 12B show tables in which X' and Y' stored in the apparatus example shown in FIG. 11 are compared with X and Y (FIG. 25C) successively stored as shown in FIG. 2. Specifically, FIG. 12A shows a state of displacement of X and Y stored in the flip-flops shown in FIG. 2, and FIG. 12B shows a state of displacement of X' and Y' stored in the flip-flops shown in FIG. 11.

In FIG. 11, a vector having a high occurability (corresponding to X in FIG. 2) is calculated by the posterior computing unit 1204 so as to obtain X=−X'. Accordingly, a vector having a next high occurability (corresponding to Y in FIG. 2) is calculated by the posterior computing units 1208, 1212 so as to obtain Y=−(X'+Y'). Accordingly, it dose not matter if data stored in the flip-flops are not the vector having a high occurability itself, but if they are information from which a vector having a high occurability can be obtained by computation.

As mentioned above, according to the above-mentioned embodiment, a multi-valued image created by a computer can be compressed at a high compression rate with no deterioration.

Embodiment 7

Detailed explanation will be hereinbelow made of an image processing apparatus in an embodiment 7 according to the present invention with reference to the drawings.

A computer created image has the following tendencies:

as a first feature, the same data follows one after another;

as a second feature, data is returned to its original data even though it varies; and as a third feature, data such as gradation which continuously varies, have a fixed variation range.

Accordingly, data having a high occurability are as follows:

1) data the same as a previous pixel d[i−1] (a differential value is zero);

2) data which are different from the previous pixel and which are previous thereof (a vector reverse to a vector upon variation in pixel value); and 3) a vector which is the same as the vector upon variation in pixel value.

That is, the differential value varies with plus 2, plus 2 variation or minus 2 variation (return to its previous color) possibly occurs. Further, it goes without saying that data can be compressed by allocating a short code to an event (case) which possibly occurs next.

Figure 27:
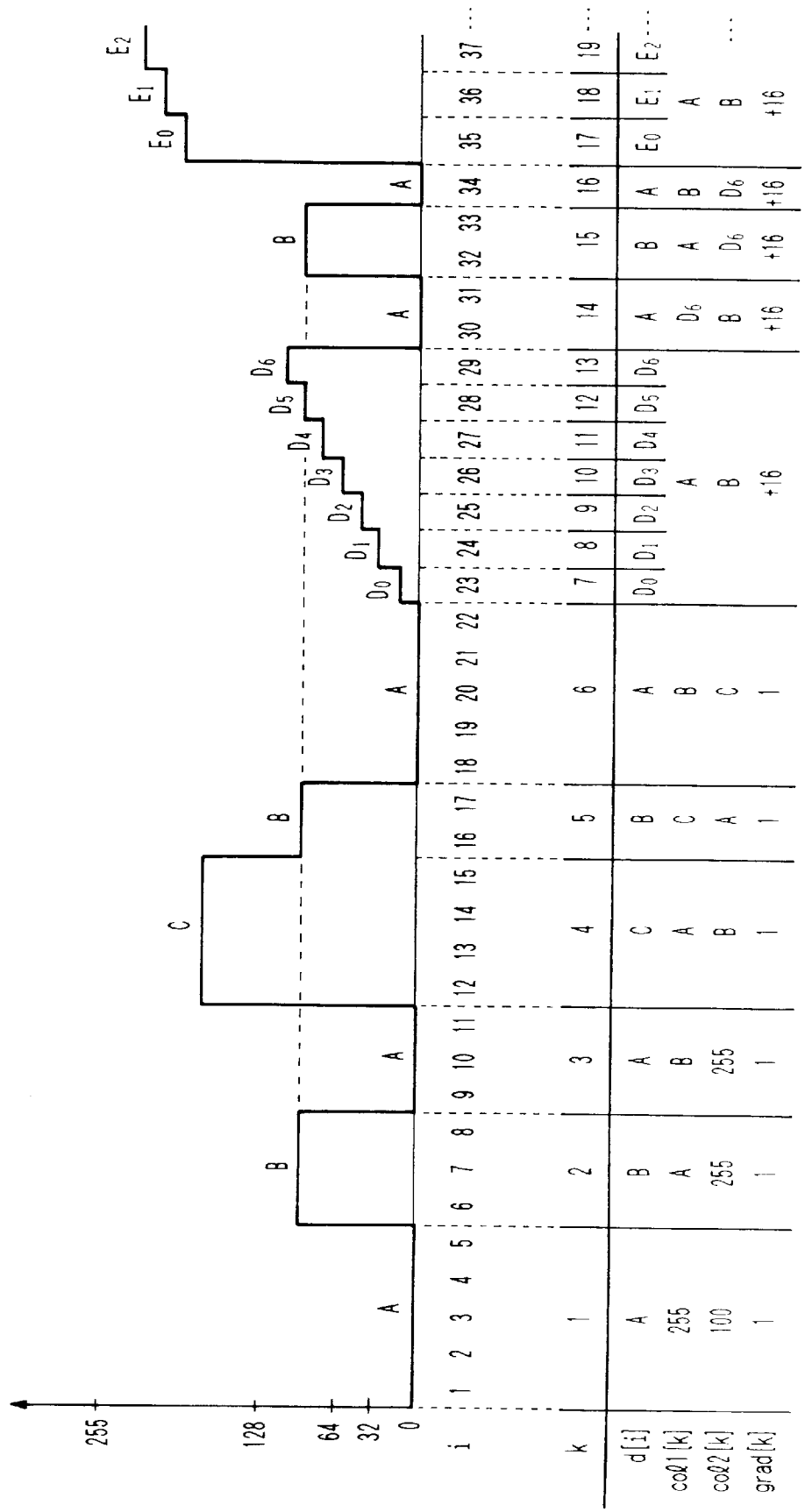
FIG. 27 is a view showing an example of a computer created image and an example of encoding according to the present invention.

FIG. 27 shows an example of a computer created image, and an example of encoding in this embodiment, in which, the ordinate exhibits data (8 bits/0 to 255), and the abscissa is a spacial axis. With reference to this figure, an example of specific data compression will be explained. By setting that the spacial variation is exhibited by a variable i, a pixel value at that time is d[i] (0 to 255), a variable incrementally increased in a block of the same color while the color is exhibited by A=0, B=96, C=192, D0=16, D1=32. . . . It is noted that the pixel value should not be limited to 8 bits, but for example, RGB 24 bits, CMYK 32 bits or a total 32 bits consisting of Labs each having 12 bits.

The following three values are set as events which are highly occurable:

col1[k]: a color which is different from d[i−1] and which occurs at the latest;

col2[k]: a color which is different from d[i−1] and col1 and which occurs at the latest;

grad[k]: a vector calculated by d[i]−di[i−1].

Further, the codes are set as follows, and it is noted that color data is appended if any one does not coincide.

| | |
|---|---|
| As d[i] = d[i−1] | '0' |
| As d[i] = col1[k] | '10' |
| As d[i] = col2[k] | '1100' |
| As d[i] = d[i−1] + grad[k] | '1101' |
| As any one does not correspond to | '111' |

The number of cases, the codes, appended data and the appended data which will be explained are merely as one example, and the invention should not be limited thereto. For example, any number of cases col1, col2 and col3 which are occurable, can be set. Further, it does not matter if the codes have values other than those, and if they have fixed values. For example, differential data can be used.

Procedure of Compression Process

Next, explanation will be detailed with reference to FIGS. 28 and 29 which are flow-charts showing an example of a procedure for a compression process.

At first as step S1, initial values such as d[0]=0, col1[1]=255, col2[1]=100, grad[1]=1 are given. But, it should not be limited to these values.

At step S2, 1 is set to the variables i and k, and at step S3, whether i>a number of all pixels or not is determined. If i>the number of all pixels, the compression process is completed. But if it is not, at step S4, the difference value diff (=d[i]−d[i−1]) is obtained. Then, whether the differential value diff is zero or not is determined at step S5.

If the differential value diff is zero, a code='0' is set at step S6, and after the variable is incrementally increased at step S7, the procedure is returned to step S3.

Meanwhile, if the differential value diff is not zero, the procedure is advanced to at step S11, the differential value diff is compared with the gradation width grad[k], and if they are coincide, code='1101' is set at step S12. At step S13, col1[k], col2[k] and grad[k] are substituted respectively into col1[k+1], col2[k+1] and grad[k+1]. After the variable k is incrementally increased at step S24, the procedure is advanced to step S7. It is noted that the reason why col1 and col2 are not changed, is such that the compression efficiency is rather higher if the old color is maintained without changing the values of col1 and col2 since the tendency in which the data are returned to its original data is rather weak in comparison with a normal edge. Of course, col1 and col2 may be changed.

Further, if diff≠grad[k], at step S14, d[i] is compared with col1[k], and if they are coincident with each other, after the variable k is incrementally increased at step S24, the procedure is advanced to step S20 after code='10' and col2[k+1]=col2[k] are set as step S15. If they are not coincident, d[i] and col2[k] are compared with each other at step S16, and if they are coincident with each other, code='1100' is set at step S17, but if they are not coincident with each other, code '111', for example, d[i] having 8 bits is set, and at the next step S19, col1[k] is substituted into col2[k+1]. Then the procedure is advanced to step S20.

At step S20, d[i−1] is substituted into col2[k], and at step S21, whether the absolute value |diff| is less than 32 or not is determined. If it is so, at step S22, diff is substituted into grad[k+1], but if it is not so, at step S23, grad[k] is substituted into grad[k+1]. After the variable k is incrementally increased at step S24, the procedure is advanced to step S7.

In this embodiment, since the gradation smoothly varies, if a data difference is more than 32 bits, it is determined that it is not gradation. That is, from step S21 to step S23, if |d[i]−d[i−1]|<32, grad[k]=diff
if |d[i]−d[i−1]|≧32, grad[k]=grad[k−1]

are set so that the gradation width grad can be held without being affected by a color data difference caused by a character edge in such a case that a character is present on the gradation, and as a result, it is possible to enhance the compression rate. Naturally, grad[k] can be set unconditionally without these conditions being applied.

Figure 28:
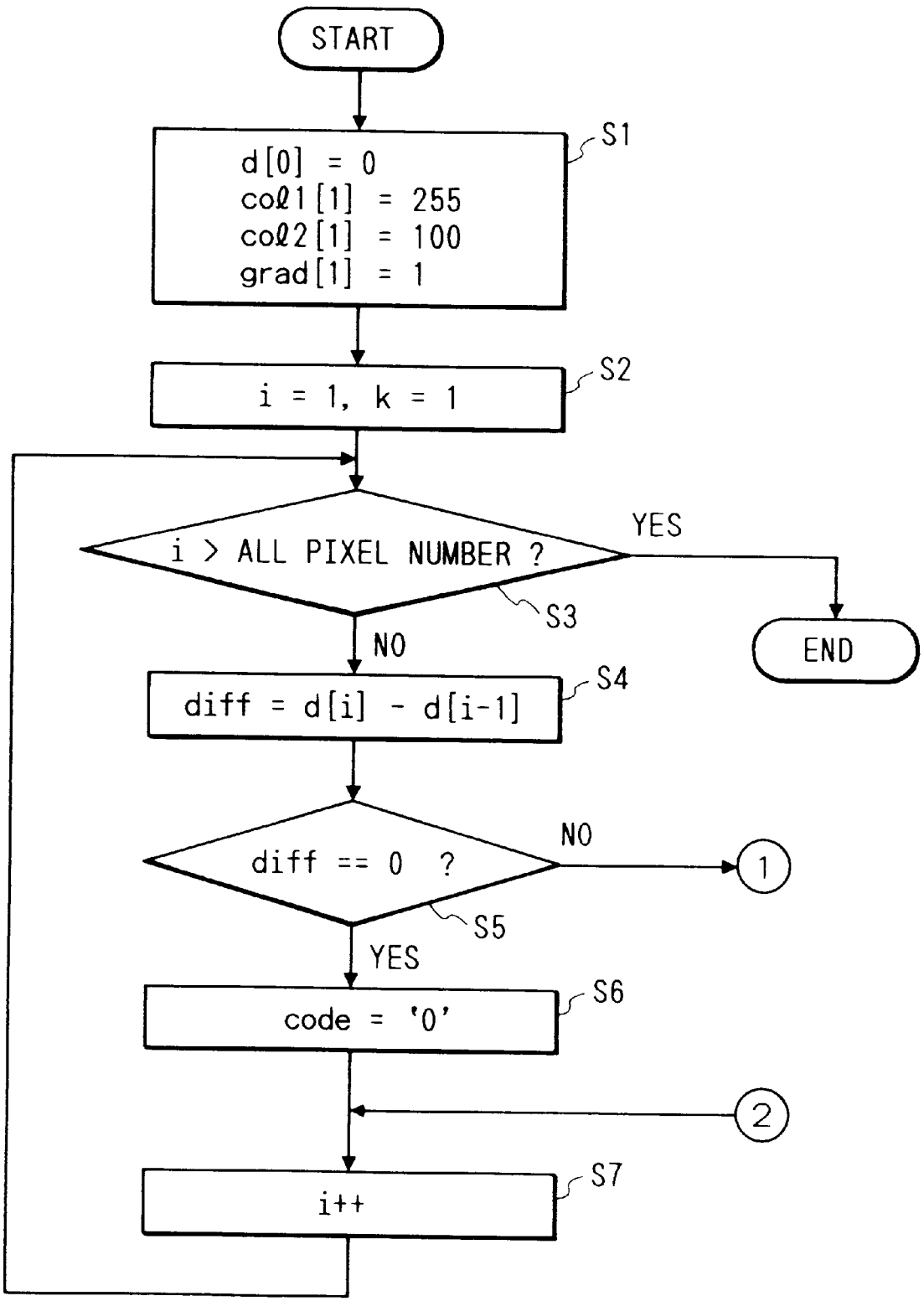
FIG. 28 is a flow-chart showing a procedure of a compression process in a seventh embodiment of the present invention.
Figure 29:
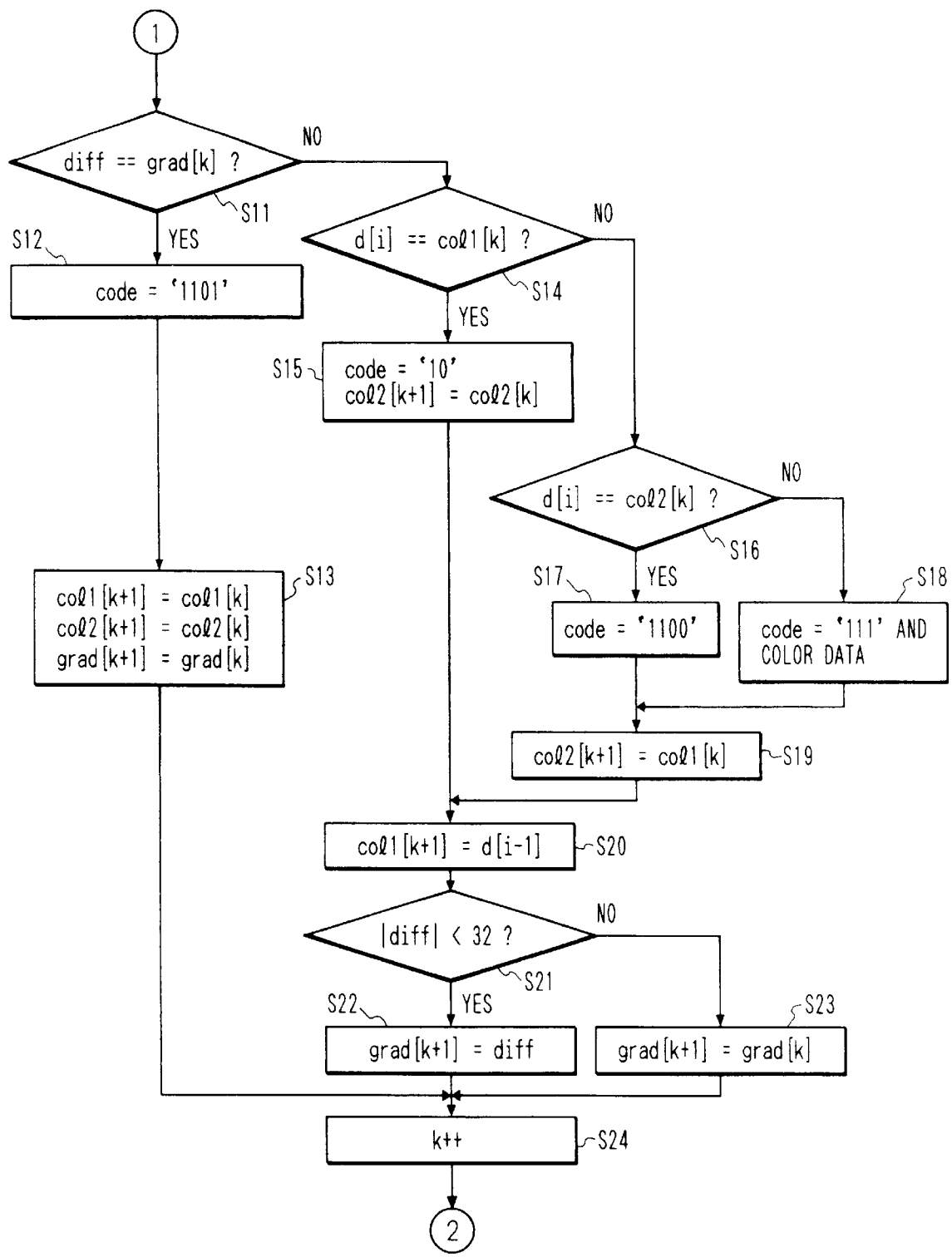
FIG. 29 is a flow-chart showing a procedure of the compression process in the seventh embodiment of the present invention.

Next, referring to FIGS. 27 to 29, the compression process will be specifically explained.

During the period in which i=1 to 5, since d[i]=d[i−1], through step S6, code is '0'
col1, col2 and grad do not vary, and d[6] is different from any of d[5], col1[1], col2[1], and d[5]+grad[1]. Thus, through S18,
codes are '111' and '01100000'(=96)
col1[2]=d[i−1]=0(=A)
col2[2]=col1[1]=255
grad does not vary.

Here, grad[2]=d[6]−d[5]=+92 would be obtained, but since the gradation smoothly varies, if the data difference of more than 32 is present, it is determined that it is not the gradation.

During a period i=7 to 8, since d[1]=d[i−1], through step S6:

code is '0'
col1, col2 and grad do not vary.

Since d[9] coincides with col1[2]=0, at step S6:

code is '10'
col1[3]=d[8]=0(=A)
col2 and grad do not vary.

During a period i=10 to 11, since d[1]=d[i−1], through step S6:

code is '0'
col1, col2 and grad do not vary.

Since d[12] is different from any of d[11], col1[3], col2[3], and d[11]+grad[3], through step S18,
codes are '111' and '11000000'(=192)
col1[4]=d[11]=0(=A)
col2[4]=col1[3]=96(=B)
since |d[12]−d[11]|≧32, grad does not vary.

During a period i=13 to 15, since d[1]=d[i−1], through step S6:

code is '0'
col1, col2 and grad do not vary.

Since d[16] coincides with col2[4]=96, through step S17:

code is '1100'
col1[5]=d[15]=192(=C)
col2[5]=col1[4]=0(=A)

since |d[16]−d[15]|≧32, grad does not vary.

Since d[17]=d[16], through step S6, code is '0'
col1, col2 and grad do not vary.

Since d[18] coincides with col2[5]=0, through step S17:

code is '1100'
col1[6]=d[17]=96(=B)
col2[6]=col1[5]=192(=C)
since |d[18]−d[17]|≧32, grad does not vary.

During a period i=19 to 22, since d[1]=d[i−1], through step S6:

code is '0'
col1, col2 and grad do not vary.

Since d[23] is different from any of d[22], col1[6], col2[6], and d[22]+grad[6], through step S18,
codes are '111' and '00010000'(=16=D0)
col1[7]=d[22]=0(=A) col2[7]=col1[6]=96(=B)
since |d[23]−d[22]|≧32, grad[7]=d[23]−d[22]=+16

During a period i=24 to 29, since d[i] coincides with d[i−1]+grad[k], through step S12:

code is '1101'
col1, col2 and grad do not vary.

It is noted that although d[28] also coincides with col2[11] (d[28]=col2[11]=96), since the gradation is preferential in this embodiment, col1 and col2 are not changed, similar to the process in which it coincides with the gradation.

Since d[30] coincides with col1[13]=0, through step S15:

code is '10'
col1[14]=d[13]=112(=D6)
col1, col2 and grad does not vary.

Since d[31]=d[30], through step S6, code is '0'
grad does not vary.

Since d[32] coincides with col2[14]=96, through step S17:

code is '1100'
col1[15]=d[31]=0(=A)
col2[15]=col1[14]=112(=D6)
grad does not vary.

Since d[33]=d[32], through step S6, code is '0'
col1, col2 and grad do not vary.

Since d[34] coincides with col1[15]=0, through step S15:

code is '10'
col1[16]=d[33]=96(=B)
col1 and grad do not vary.

Since d[35] is different from any of d[34], col1[16], col2[16], and d[34]+grad[16], through step S18,
codes are '111' and '11010000'(=208)
col1[17]=d[34]=0(=A)
col2[17]=col1[16]=96(=B)
since |d[35]−d[34]|≧32, grad does not vary.

During a period i=36 to 37, since d[i] coincides with d[i−1]+grad[k]:

code is '1101'
col1, col2 and grad do not vary.

Figure 13:
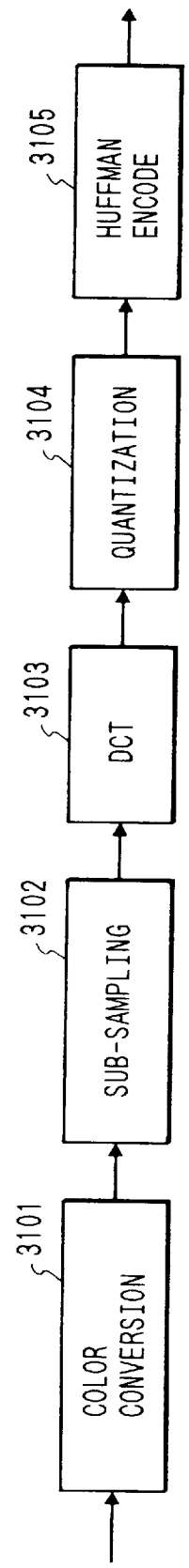
FIG. 13 is a view for explaining an ADCT compression process in a conventional technique.
Figure 14:
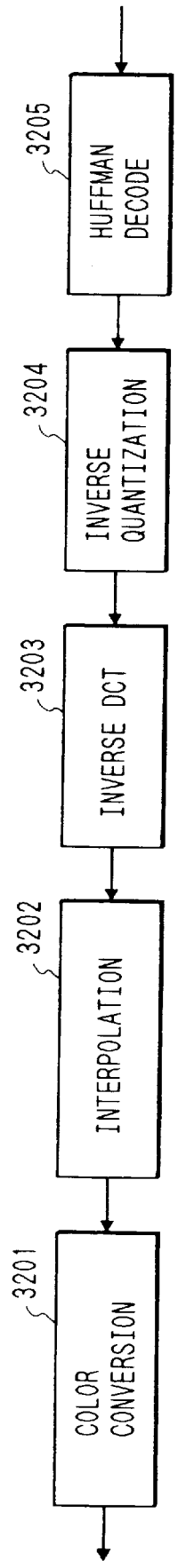
FIG. 14 is a view for explaining an ADCT compression process in a conventional technique.
Figures 22, 23:
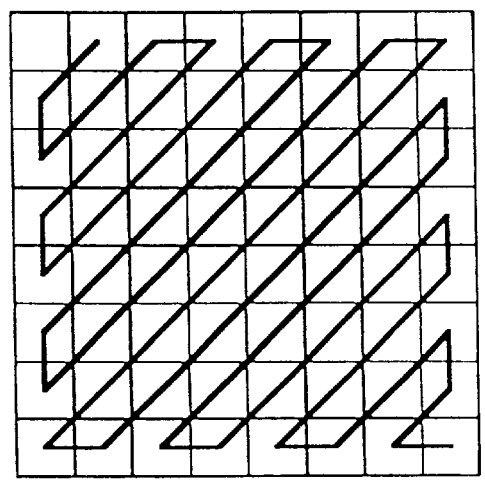
FIG. 22 is a view for explaining an ADCT compression process in a conventional technique.
FIG. 23 is a view for explaining an ADCT compression process in a conventional technique.

As the encoding is made as mentioned above, codes (code 1) for 37 pixels, i=1 to 37, becomes '/0/0/0/0/0/ 11101100000/0/0/10/0/0/11111000000/0/0/0/ 1100/0/1100/ 0/0/0/0/111100010000/1101/1101/1101/1101/ 1101/1101/ 10/0/1100/0/10/11111010000/1101/1101'. It is noted that '/' exhibits a partition between pixels (or codes), and is not contained in an actual code. Accordingly, in the example shown in FIG. 13, 37 pixels each having 8 bits, that is, 296 bits in total is compressed to 113 bits.

Expansion Process

Figure 30:
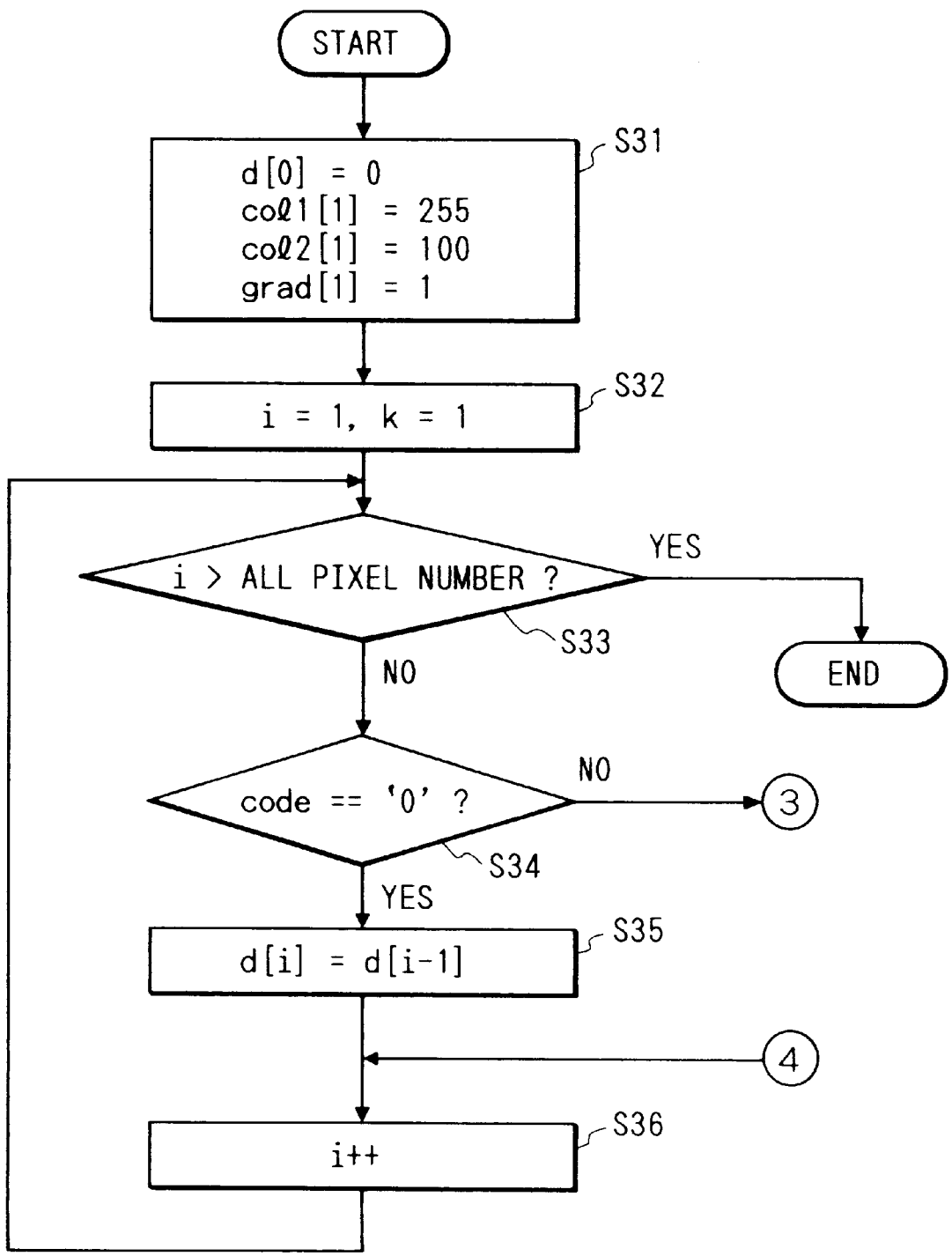
FIG. 30 is a flow-chart showing a procedure of the compression process in the seventh embodiment of the present invention.
Figure 31:
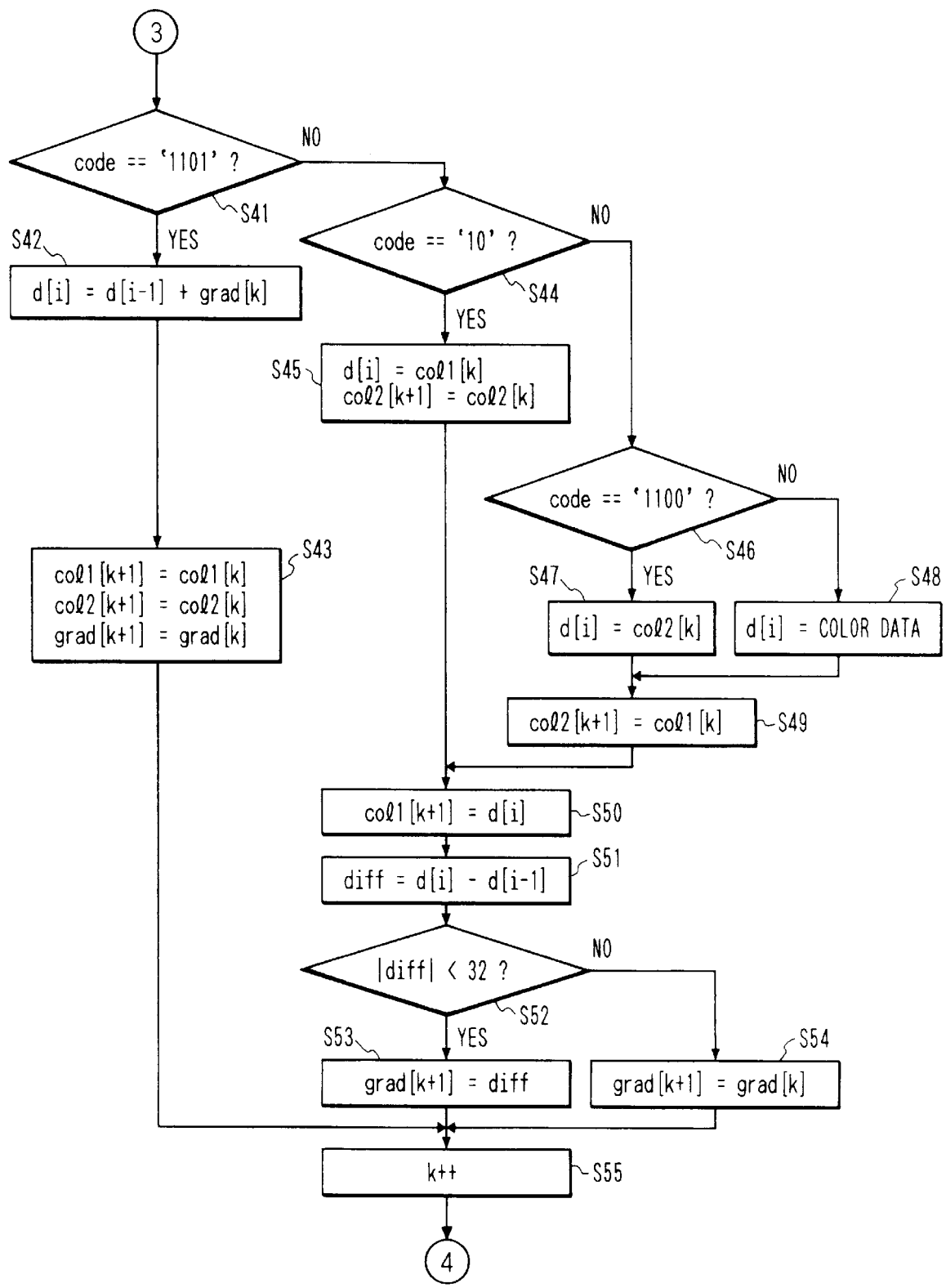
FIG. 31 is a flow-chart showing a procedure of the compression process in the seventh embodiment of the present invention.

Next, the expansion process in this embodiment will be detailed. FIGS. 30 and 31 are flow-charts which show the procedure in the expansion process.

First, at step S31, initial values d[0], col1[1]=255, col2[1]=100 and grad[1]=1 which are the same as those during compression, are given, and at step S32, 1 is set to variables i and k. At step S33, whether i>a number of all pixels or not is determined, if i>the number of all pixels, the expansion process is completed, but if it is not, whether code is '0' or not is determined at step S34.

If the code is '0', d[i−1] is substituted into d[i], and the variable i is incrementally increased as step S36. Then, the procedure is returned to step S33.

Meanwhile, the code is not '0', the procedure is advanced to step S41, and if the code is '1101', d[i−1]+grad[k] is substituted into d[i] at step S42 while col1[k], col2[k] and grad[k] are substituted respectively into col1[k+1], col2[k+1] and grad [k+1]. Then the variable k is incrementally increased at step S55, and thereafter the procedure is advanced to step S36.

Further, d[i]=col1[k] and col2[k+1]=col2[k] are set at step S44 if code≠'1101' but at step S45 if code='10', and thereafter, the procedure is advanced to step S50. col2[k] is substituted into d[i] at step S46 if code≠'10', but at step S47 if code='1100'. If code≠'1100', consecutive color data having, for example, 8 bits, are substituted into d[i] at step S48, and at next step S49, col1[k] is substituted into col2[k+1]. Thereafter, the procedure is advanced to step S50.

At Step S50, d[i] is substituted into col1[k+1], and at step S51, the differential value diff (=d[i]−d[i−1]) is obtained. At step S52 whether the absolute value |diff| is less than 32 or not is determined, and if it is so, diff is substituted into grad[k+1] at step S53. But if it is not, grad[k] is substituted into grad[k+1] at step S54. Then, the variable k is incrementally increased at step S55, and thereafter, the procedure is advanced to step S36.

Next, specific explanation will be made of an example in which the above-mentioned code 1 is expanded.

At first, since consecutive five codes <0> are present, d[0] (=A) is substituted into d[1] to d[5] at step S35.

The next code is <111> which indicates that data different from col1[1], col2[1], and d[5]+grad[1] occur, and accordingly, 96(=B) obtained from consecutive next 8 bits is substituted into d[6] (d[6]=96). It is noted that although the data are obtained from the consecutive 8 bits, it goes without saying that if original data has 24 bits, the data are obtained from consecutive 24 bits. Further, d[5]=0 is substituted into col1[2], and col1[1]=255 is substituted into col2[2]. Further, |d[6]−d[5]|=96 which is larger than 32, and accordingly, grad does not vary.

Next, from consecutive two codes <0>, d[6]=96(=B) is substituted into d[7] and d[8] at step S35, and since it is indicated that the next code <10> is equal to col1[2], col2[2]=0(=A) is substituted into d[9] at step S45. Further, d[8]=96 is substituted into col1[3] but col2[3] is not changed. Since |d[9]−d[8]|=96 which is lager than 32, grad is not changed. Next, from consecutive two codes <0>, =0(=A) can be led for d[10] and d[11], and 192(=C) obtained from consecutive 8 bits by the next code <111>, is substituted into d[12].

Further, d[11]=0 is substituted into col1[4], and col1[3]=96 is substituted into col2[4]. Further, |d[12]−d[11]|=192 which is lager than 32, grad is not changed (grad[4]=grad[3]=1).

Next, from the consecutive three codes <0>, d[12]=192 (=C) is substituted into d[13] to d[15] at step S35, and since it is indicated that the next code <1100> is equal to col2[4], col2[4]=96(=B) is substituted into d[16] at step S47. Further, d[15]=192 is substituted into col1[5], and col1[4]=0 is substituted into col2[5]. Further, |d[16]−d[15]|=96 which is lager than 32, grad is not changed.

From the next code <0>, d[16]=96(=B) is substituted into d[17] at step S35, from the next code <100>, col2[5]=0(=A) is substituted into d[18] at step S47. Further, d[17]=96 is substituted into col1[6], and col2[5]=192 is substituted into col2[6]. Further, since |d[17]−d[16]|=96 which is lager than 32, grad is not changed.

Next, from the consecutive four codes <0>, d[18]=0(=A) is substituted into d[19] to d[22] at step S35, and by the next code<111>, 16(=D0) which is obtained from consecutive 8 bits is substituted into d[23] at step S48. Further, d[22]=0 is substituted into col1[7], and col1[6]=96 is substituted into col2[7]. Further, since |d[23]−d[22]|=16 which is less than 32, d[23]−d[22]=16 is substituted into grad[7].

Next, six codes <1101> are consecutive, and since it is indicated that it is equal to d[i]=d[i−1]+grad[k], at step S42 d[23]+grad[7]=32(=D1) is substituted into d[24], d[24]+grad[7]=48(=D2) into d[25], . . . , and d[28]+grad[7]=112 (=D6) into d[29]. In this state, col1, col2 and grad are not changed.

Since it is indicated that the next code <10> is equal to col1[13], col1[13]=0(=A) is substituted into d[30] at step S45. Further, d[29]=112 is substituted into col1[14], col2 [14] is not changed. Further, since |d[30]−d[29]|=112 which is larger than 32, grad is not changed.

Since the next code is <0>, d[32]=96(=B) is substituted into d[33] at step S35, and since it is indicated that the next code <10> is equal to col1[15], col1[15]=0(=A) is substituted into d[34] at step S45. Further, d[33]=96 is substituted into col1[16], col2[16] is not changed. Further, since |d[34]−d[33]|=96 which is larger than 32, grad is not changed.

Since it is indicated that the next code <111> exhibits occurrence of data which is different from col1[16], col2 [16], and d[34]+grad[16], and 208 (E0) which is obtained from the consecutive 8 bits is substituted into d[35] at step S48. Further, d[16]=0 is substituted into col1[17], and col1[16]=96 is substituted into col2[17]. Further, since |d[23]−d[22]|=208 which is larger than 32, grad is not changed.

Next, it is indicated that the consecutive two codes <1101> are equal to d[i]+grad[k], at step S42, d[35]+grad [17]=224(=E1) is substituted into d[36], and d[36]+grad [17]=240(=E2) is substituted into d[37]. In this state, col1, col2 and grad are not changed.

With the above-mentioned process, image data shown in FIG. 27 can be restored from the code 1 without loosing even one bit.

Hardware Arrangement

The hardware arrangement of this embodiment is the same as that illustrated in FIG. 1, so that the explanation thereof will be omitted.

Figure 32:
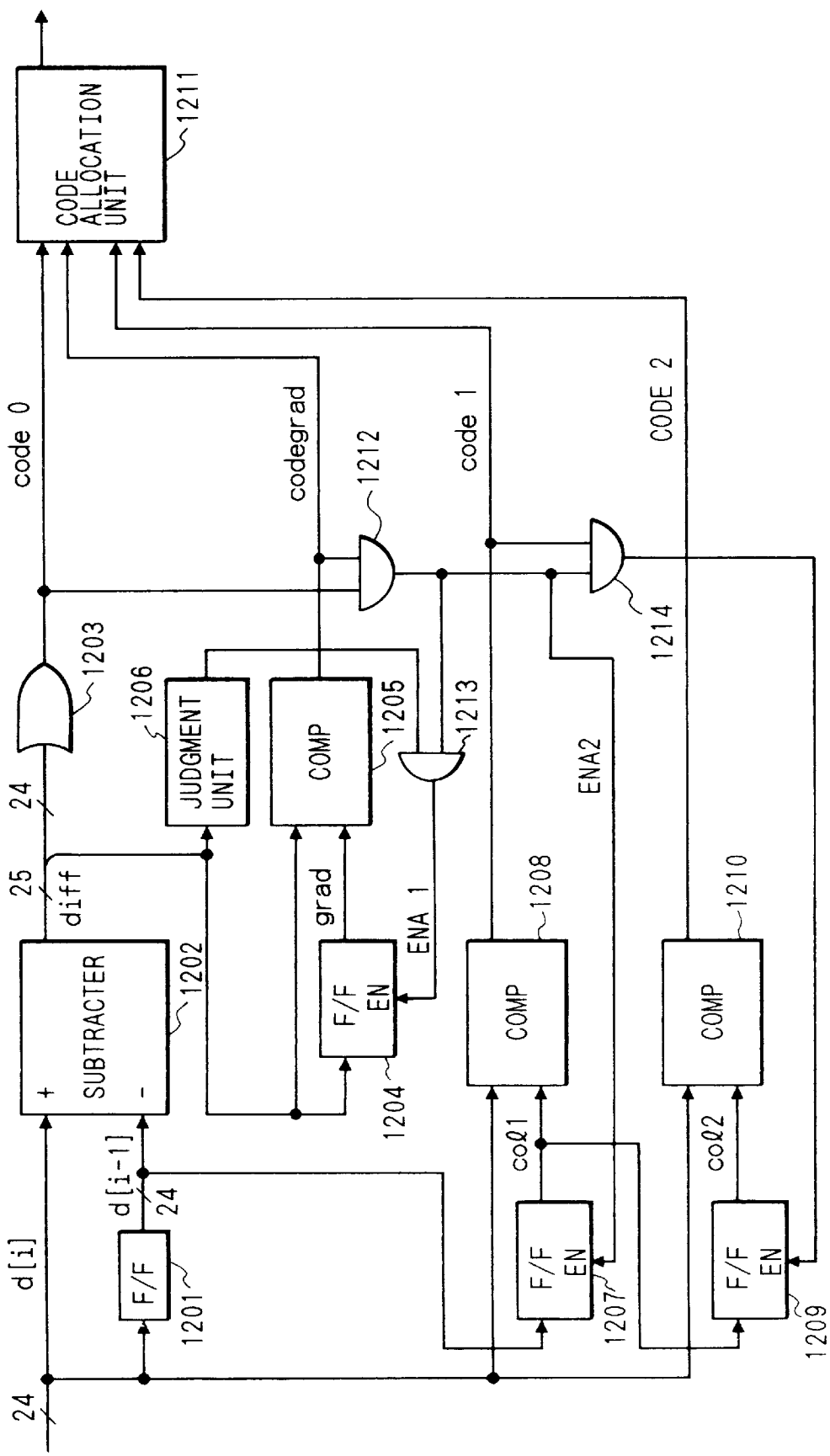
FIG. 32 is a block diagram showing an example of a detailed arrangement of a compression part in the seventh embodiment.

FIG. 32 is a block diagram which shows a detailed arrangement of the compression part 102. It is noted that although an arrangement for compressing image data of RGB 24 bits will be explained hereinbelow, but it should be understood that image data of RGB 8 bits, CMYK 32 bits or Lab 36 bits can be also compressed, as mentioned above.

A flip-flop (which will be hereinbelow denoted simply as F/F) 1201 having 24 bits, and stores an image pixel which is inputted in synchronization with a clock. It is noted that, for example, white (255, 255, 255) is stored as an initial value, in F/F 1205.

A subtractor 1202 inputs a pixel d[i] and a one-before pixel d[i−1] outputted from the F/F 1201, for computing d[i]−d[i−1], and outputs differential data diff having 25 bits.

An OR gate 1203 takes logic OR for the lower order 24 bits of diff outputted from the subtractor 1202, and outputs data code0 having one bit. The code0 becomes '0' when the diff is zero, but '1' if the diff is other than zero.

An F/F 1204 incorporating an enable terminal and having 25 bits, inputs diff outputted from the subtractor 1202, and stores the same when a control signal ENA is 1. It is noted that, for example, (1, 1, 1) is stored as an initial value into the F/F 1204.

A comparator 1205 compares diff outputted from the subtractor 1202, with grad outputted from the F/F 1204, and outputs date codegrad having one bit. It is noted that codegrad becomes '0' when the result of the comparison exhibits coincidence, but becomes '1' when it does not exhibit coincidence.

A judgement unit 1205 inputs diff outputted from the subtractor 1202, and outputs '0' if |diff|<32, but '1' if it is not.

An F/F 1207 incorporating an enable terminal and having 24 bits, inputs d[i−1] outputted from the F/F 1202, and stores the same if a control signal ENA2 is '1'. It is noted that black (0, 0, 0) is stored as an initial value, in the F/F 1207.

A comparator 1208 compares the pixel d[i] with coil outputted from the F/F 1201, and outputs code1 having one bit. It is noted that the code1 becomes '0' if the result of the comparison exhibits coincidence, but '1' if the result of the comparison exhibits non-coincidence.

An F/F 1209 incorporating an enable terminal and having 24 bits inputs a col1 outputted from the F/F 1201 in synchronization with a clock, and stores the same if a control signal ENA3 is '1'. It is noted that, for example, red (255, 0, 0) are stored as an initial value, in the F/F 1209.

A comparator 1210 compares the pixel d[i] with col2 outputted from the F/F 1209, and outputs code2 having one bit. It is noted that the code2 becomes '0' if the result of comparison exhibits coincidence but '1' if the result of the comparison exhibits non-coincidence.

A code allocating part 1211 outputs codes which are allocated in accordance with inputted code0, code1, code2 and codegrad. In the data compression apparatus in this embodiment, the following five cases are present:

(1) differential value diff is 0;

(2) color data d[i] is coincident with col1;

(3) color data d[i] is coincident with col2;

(4) differential value diff is coincident with grad; and (5) other than that mentioned above.

For example, the code allocating part 1211 outputs a code '0' for the case (1), a code '10' for the case (2), a code '1100' for the case (3), a code '1101' for the case (4), and a code '111' for the case (5).

FIG. 33 shows the above-mentioned relationship. It is noted that the code allocating part 1211 can also cope with such a case that the code is desirably changed in dependence upon a situation. Further, when the compression part 1102 outputs the code '1101', it consecutively outputs pixels d[i] as mentioned above.

Further, the control signal ENA1 is set to '1' by means of AND gates 1212, 1213 if code0='1' and codegrand='1', and if the output of the judgement unit 1206 is set to '1'. Further, the control signal ENA2 becomes '1' by means of the AND gate 1212 if code0='1' and codegrad='1'. The control signal ENA3 is set to '1' by the AND gates 1212, 1214 if code0='1', codegrad='1' and code1='1'.

It is noted that the formation of the control signals, a number of cases, and the codes are in one of examples, and the invention should be limited to this example.

As mentioned above, according to this embodiment, the image data can be compressed and expanded without loosing even one bit. For example, a multi-valued image created by the computer can be compressed at a high compression rate with no deterioration. Further, the encoding can be made in consideration with gradation, and accordingly, a computer created image applied with gradation can be effectively compressed.

Variant Forms

Explanation will be hereinbelow made of variant forms of the above-mentioned embodiments.

First Variant Form

In the above-mentioned embodiment, events which possibly occur, are exhibited by color data col1, col2 and a gradation width grad, but they may be exhibited by differential values. For example, if it is exhibited by X, Y, grad, data change an example of which is shown in FIG. 34 is required in order to carry out the operation similar to that shown in FIG. 27.

The calculation formula can be exhibited as follows: denoting that a vector which possibly occurs next to <0> and X[k] is Y[k], and setting as diff=d[i]−d[i−1];

as diff is zero, X[k] and Y[k] do not vary;

as diff coincides with grad[k],
X[k+1]=X[k]−diff, Y[k+1]=Y[k]−diff;

as neither diff is zero nor grad[k],
Y[k+1]=−diff, Y[k+1]=−diff+A[k]

where A[k] becomes Y[k] if an occurrence vector coincides with X[k], but X[k] if it is not.

Figure 35:
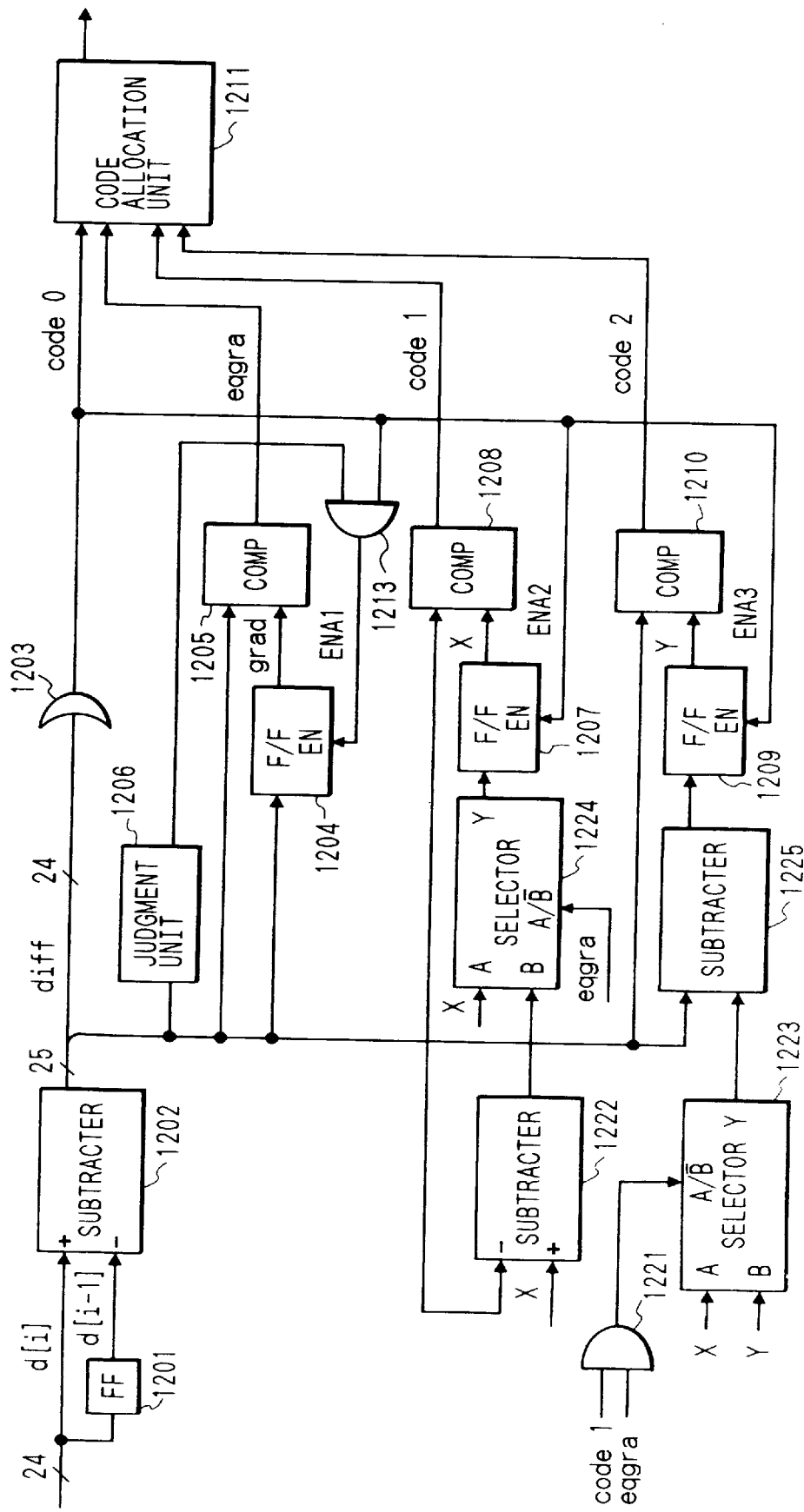
FIG. 35 is a block diagram showing an arrangement of a compression part in a first variant form.

FIG. 35 is a block diagram which shows an example of the arrangement of the compression part 102 in the first variant form.

A selector 1224 selects and outputs either data X or X-diff outputted from the subtractor 1222 in accordance with an output eqgra of the comparator 1205. An output from the selector 1224 is latched by the F/F 1207 in synchronization with a clock so as to be turned into data X when the control signal ENA2(=code0) is '1'.

The comparator 1208 compares data X with diff, and outputs code1 having one bit. It is noted that the code1 becomes '0' if the result of comparison exhibits coincidence but '1' if the result of comparison exhibits non-coincidence.

A selector 1223 selects and outputs either data X or Y in accordance with a result of the logic AND of code0 outputted from the AND gate 1221, and eqgra.

A subtractor 1225 subtracts diff from the output of the selector 1223. The output of the subtractor 1225 is latched by the F/F 1209 in synchronization with a clock so as to be turned into data Y when the control signal ENA3 (=code0) is '0'.

The comparator 1210 compares data Y with diff and outputs code2 having one bit. It is noted that code2 becomes '0' if the result of comparison exhibits coincidence but '1' if the result of comparison exhibits non-coincidence.

Second Variant Form

In the above-mentioned first variant form, only two vectors X, Y are used for giving codes as they have high occurability. However, it should not be limited two, but any number of vectors can be logically used. In this case, the calculation formula for the vectors is exhibited as follows.

Vectors which have been denoted by X[k], Y[k] in the first variant form will be denoted by vect[m][k] in this variant form, where m=0 to 2. When m=0, it corresponds to X in the first variant form, but when m=1, it corresponds to Y in the first embodiment.

The vector [m][k] is updated as follows if diff≠0 (variation in color occurs):

$$\text{vect}[0][k+1] = -\text{diff} + Z;$$
where if (diff == grad[k]), Z = vect[0][k];
  else Z = 0;
$$\text{vect}[1][k+1] = -\text{diff} + A;$$
where if ((diff == grad[k]) || (diff == vect[0][k])), A = vect[1][k]
  else A = vect[0][k];
$$\text{vect}[2][k+1] = -\text{diff} + B;$$
where if ((diff == grad[k]) || (diff == vect[0][k]) || (diff == vect[1][k])), B = vect[2][k]
  else B = vect[1][k];
  :
  :
  :
$$\text{vect}[n][k+1] = -\text{diff} + P;$$
where if ((diff == grad[k]) || (diff == vect[0][k]) || (diff == vect[1][k]) || .... || (diff == vect[n-1][k], P = vect[n][k]
  else P = vect[n-1][k];

Third Embodiment

In the above-mentioned embodiment, the control signals ENA1, ENA2, ENA3 for the F/Fs are exhibited by respectively:

ENA1 = (code0 & codegrad & hantei)
     = ((diff ! = 0) & (diff ! = grad) & (ABS(diff) < Td))

where Td is, for example, 32
Hantei is an output from the judgement unit 206

ENA2 = (code0 & codegrad)
     = ((diff ! = 0) & (diff ! = grad))
ENA3 = (code0 & codegrad & code1)
     = ((diff ! = 0) & (diff ! = grad) &(d[i] ! = col1)).

Figure 36:
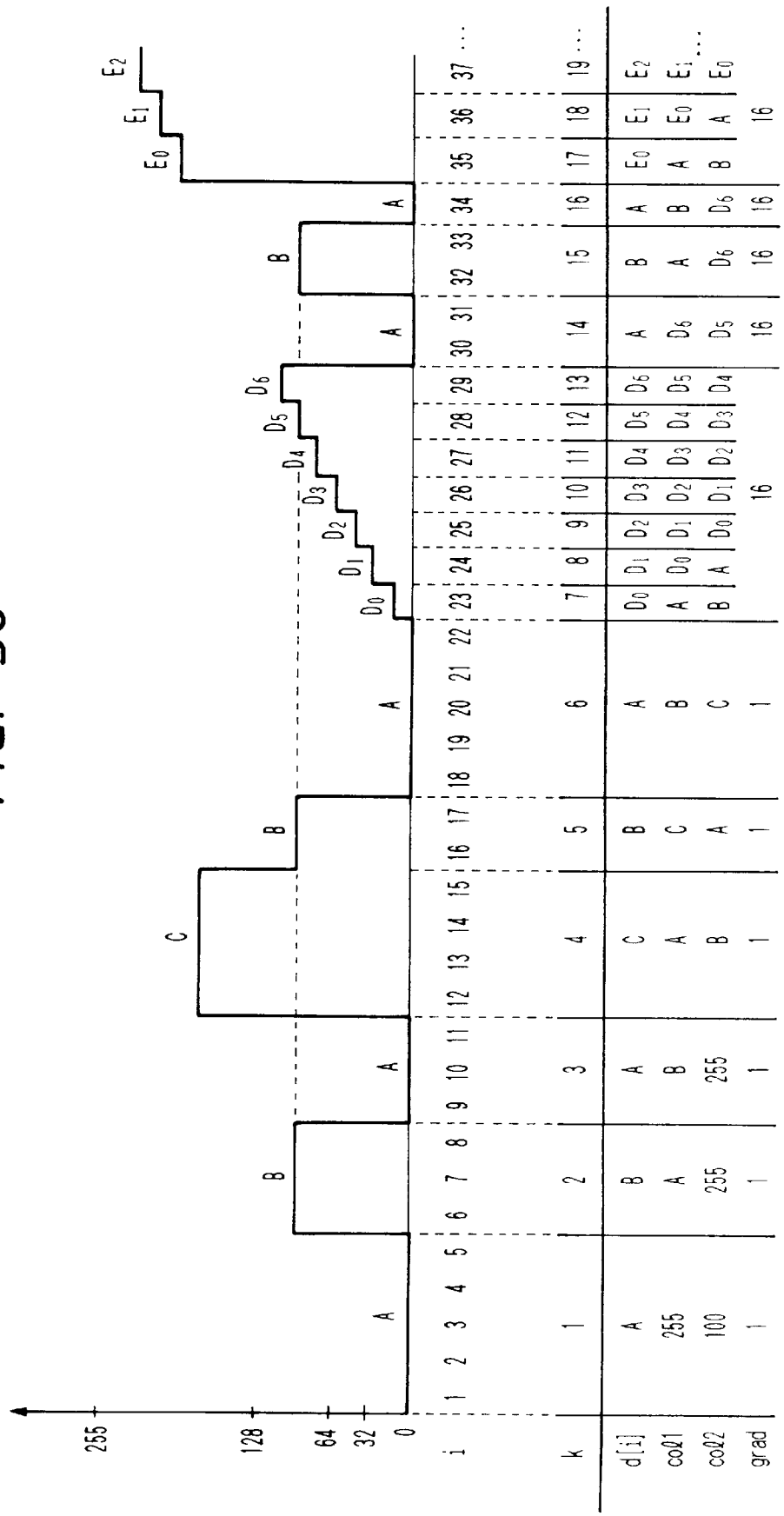
FIG. 36 is a view showing an example of a computer created image and an example of encoding in a variant form.

However, the invention should not be limited to the use of the above-mentioned control signals. For example, ENA1= (code0 & codegrad) may be used while the grad is always changed if the differential value is other than zero, irrespective of the degree of diff. Further, ENA2=code0, ENA=(code & code1) may be used, and accordingly, col1 and col2 are changed, irrespective of codegrad. In this case, variations in col1, col2 and grad can be obtained as shown in FIG. 36 if the data shown FIG. 27 are processed.

Fourth Variant Form

In the above-mentioned embodiment if a code does not coincide with any of the vectors, a pixel value (color data) is appended after a code which indicates that it does not coincide with any of the vectors. However, the present invention should not be limited to this color data, but any information indicating a color may be used.

For example, differential data or a pallet code may be appended.

Explanation will be hereinbelow made of the pallet codes.

In the case of appending fixed bit pallet information, if an 8 bit fixed pallet is used, colors are limited to 256. However, it is advantageous since only 8 bits are used in comparison with in such a case that the color data of 24 bits are used. If colors existing on the pallet are known, they can be set initially. Alternatively, such a method that a new color which occurs during compression is registered may be used. In this case, the code does not coincide with any of the vectors, the color registered on the pallet is compared with color data to be appended, and if they coincide with each other, the pallet number thereof is given or if they do not coincide with each other, a new pallet number is given, and then the pallet number is outputted together with the code.

Fifth Variant Form

In the above-mentioned embodiment, a code outputted from the compression part 102 may be further compressed in the encoding part 105 with the use of another compression process as shown in FIG. 8. As another compression process, a run length compression process, a MH or Huffman encoding process may be used. Rather than a normal MH, a code in which '0' follows one after another before '1' (for example, '00001' or '00000000001') as one unit, the Huffman encoding process can be effectively carried out.

Sixth Embodiment

In the above-mentioned embodiments or variant forms, the compression data are serially arranged and are packed into one. However, the data may be separately packed.

Figure 9:
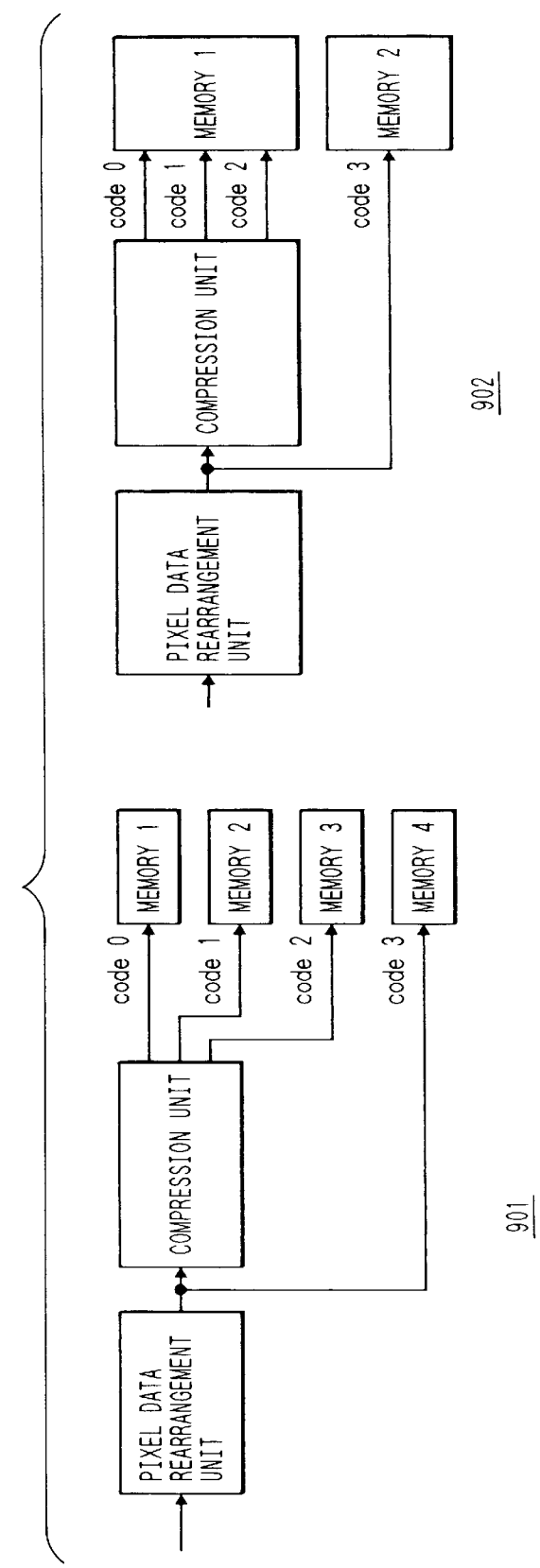
FIG. 9 is a view illustrating a compression apparatus system in a fourth embodiment of the present invention.

For example, in the above-mentioned embodiments, an information corresponding to code0 an information corresponding to code1 and an information corresponding to code2 and an information indicating a color to be appended may be stored respectively in separate memories as shown in FIG. 9.

For example, in the case of packing with a 32 bit width, code data are stored from a first bit or a fifth bit since the codes corresponding to code0, code1, code2 have variable lengths. Accordingly, if the data are packed into one memory, the area where the codes are stored is always unstable, and accordingly, a barrel shifter is required so that the circuit size of the pack part 103 becomes large. This disadvantage can be eliminated by separately packing the data. In particular, it is difficult to pack color data having 24 bits, and accordingly, the code0, code1 and code2 may be packed together, but only the color data having 24 bits may be packed separately as shown as an example in FIG. 9 (902).

Further, by packing the code0, code1 and code2 are separately stored, zeros highly possibly follow one after another in such a case that the code data are compressed by the run length compression process, thereby it is possible to enhance the effect of the run-length compression.

Seventh Variant Form

In the above-mentioned sixth variant form in which the separate memories are used respectively for code0, code1, code2 and color data, if the same data are consecutive, irrespective of '0' or '1', the code can be effectively compressed by the run length compression process. The codes indicating code0, code1 and code2 may be toggled with the use of the code allocating part 211.

FIG. 10A shows codes along with the embodiments. These codes are turned into toggle codes as shown FIG. 10B. That is, The next code is reversed, starting from the occurrence of '1' in FIG. 10A. Accordingly, '0' or '1' is consecutive, and in particular, code0 is effective if the run length compression process is carried out later.

Eighth Variant Form

In the above-mentioned first and second variant forms, although the explanation has been made such that the values of vectors having high occurabilities themselves are stored in the F/Fs 1206, 1210, information with which vectors having high occurabilities can be computed by a posterior computing part or the like with the use of the vectors having high occurabilities themselves.

FIG. 12A is a view showing displacements of X, Y stored by the compression part shown in FIG. 35, and FIG. 12B is a view showing displacements of X', Y' stored by the compression part in this variant form.

In this variant form, a vector having a high occurability (corresponding to X) is calculated from X=−X' by use of a later computation. Further, a vector having a secondary high occurability (corresponding to Y) is calculated from Y=−(X'+Y') by a later computation. Accordingly, data stored in the F/Fs may not be vectors having high occurabilities themselves, but be information from which vectors having high occurabilities can be computed.

Ninth Embodiment

In the above-mentioned embodiment, data inputted in the F/F 1207 are outputted from F/F 1201, and data inputted in the F/F 1209 are outputted from the F/F 1207, and accordingly, they are arranged in a string. However, it should not be limited to this arrangement.

Figure 37:
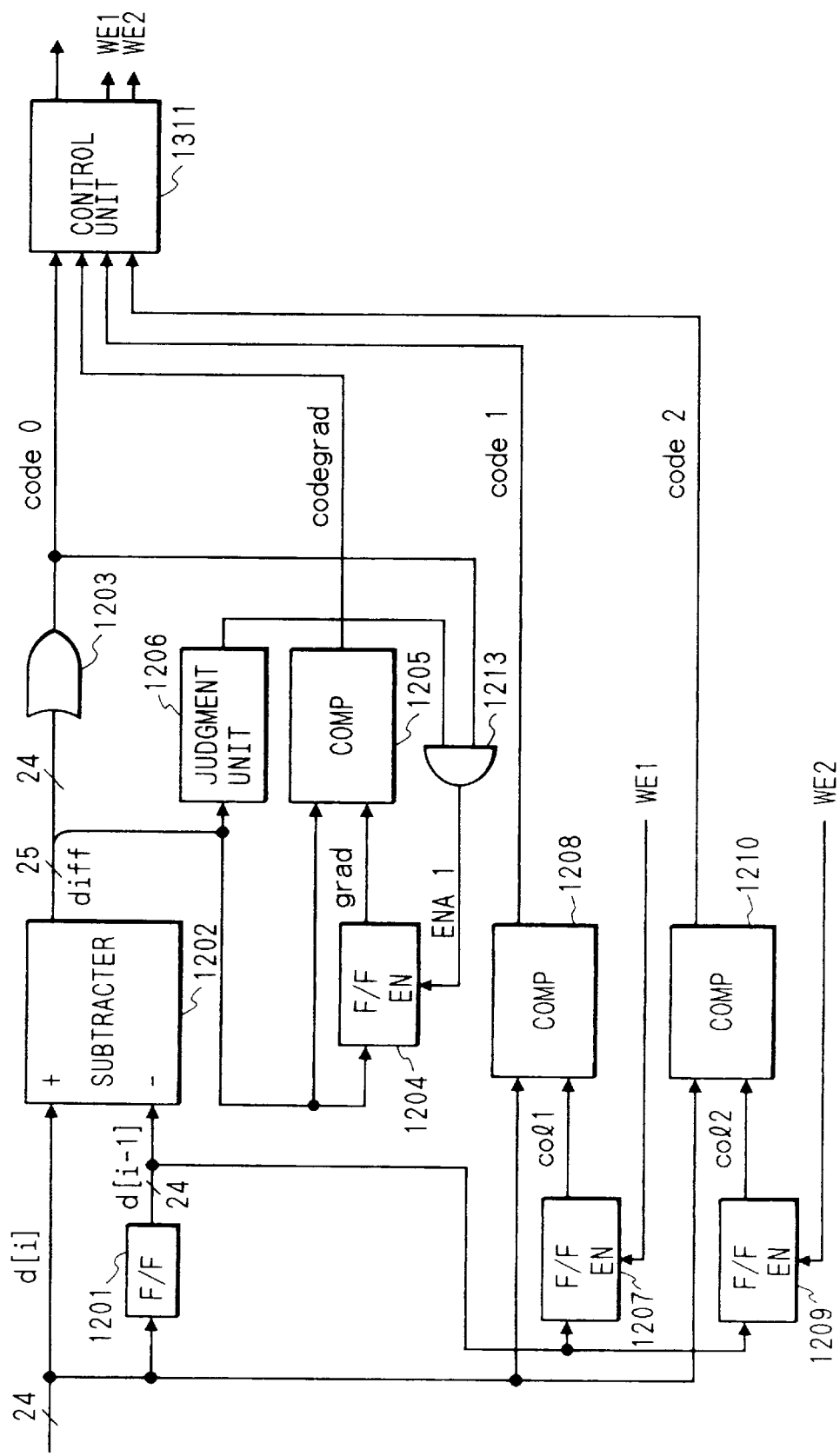
FIG. 37 is a block diagram showing an example of an arrangement of a compression part in a variant form.

For example, as in an example shown in FIG. 37, either data inputted in the F/F 1204, or data inputted in the F/F 1209 can be obtained from the output of the F/F 1201. In this case, a control part 1311 is newly added so as to output a signal WE1 for controlling the F/F 1207 and a signal WB2 for controlling the F/F 1209, in addition to the allocation of the codes.

Tenth Variant Form

In the above-mentioned embodiments or the variant forms, the following new conditions can be incorporated:

a threshold value Tj is newly incorporated, and a code for such a case that the absolute value of (diff-grad) is not zero but less than Tj, is also newly incorporated. Accordingly, the code and (diff-grad) are separately appended to the lower order (Tj+1) bits.

In more detail, for example, the setting is made as follows:

```
if (diff == 0) code = '0'
    else if(diff == grad) code = '11010'
    else if(ABS(diff − grad) < Tj) code = '11010'
and L(diff)
    else if(d[i] == col1) code = '10'
    else if(d[i] == col2) code = '1100'
    else code = '111' + color data;
``` where L(diff): differential data for (Tj+1) bit. In this case, if Tj is 3, and if (diff-grad) is 1, the code is exhibited as '11011001', and if (diff-grad) is −3, the code is exhibited as '11011101'.

As mentioned above, according to the present invention, a multivalued image created by a computer or the like can be compressed at a high compression rate with no deterioration. Further, the encoding is carried out in consideration with gradation, and accordingly, a computer created image subjected to gradation can be effectively compressed.

It is noted that either hardware or software can be used for materializing the above-mentioned all embodiments and variants forms.

Further, the present invention can be applied to either a system composed of several equipments such as a host computers, a color communication device, or a single unit such as an image file device.

Further, it goes without saying that the present invention can be applied to an arrangement which can be achieved by supplying a program stored in a floppy disc or the like into a system or an apparatus.

The present invention should not be limited to the above-mentioned embodiments, but various modifications and applications can be made thereto within the scope of the invention defined by the appended claims.

What is claimed is:

1. A data compression apparatus comprising:

input means for serially inputting multi-level data;

generating means for serially generating a respective differential value between each two consecutively inputted ones of the multi-level data, said generating means generating a second differential value after generating a first differential value;

first determining means for determining whether the first differential value is zero or not;

first memory means for storing therein a value based upon the first differential value when the first differential value is not zero;

second determining means for determining whether the second differential value coincides with a differential value represented by the value stored in said first memory means; and output means for outputting data representing the determination result of said second determining means as data representing the second differential value.

2. A data compression apparatus as set forth in claim 1, further comprising second memory means for storing therein a predetermined value in accordance with a result of the determination by said second determining means.

3. A data compression apparatus as set forth in claim 2, wherein said generating means generates a third differential value after generating the second differential value, said apparatus further comprising third determining means for determining whether the third differential value coincides with the predetermined value stored in said second memory means.

4. A data compression apparatus as set forth in claim 1, wherein said multi-level data are a plurality of color component data.

5. A data compression apparatus as set forth in claim 1, further comprising encoding means for encoding the data outputted from said output means.

6. A data compression apparatus as set forth in claim 1, wherein said apparatus is constituted by a hardware circuit.

7. A data compression apparatus as set forth in claim 1, wherein said apparatus carries out a process by use of software in a computer.

8. A data compression method comprising:

an input step of serially inputting multi-level data;

a generating step of serially generating a respective differential value between each two consecutively inputted ones of the multi-level data, said generating step generating a second differential value after generating a first differential value;

a first determining step of determining whether the first differential value is zero or not;

a first memory step of storing in a memory a value based upon the first differential value when the first differential value is not zero;

a second determining step of determining whether the second differential value coincides with a differential value represented by the value stored in the memory; and an output step of outputting data representing the determination result of said second determining step as data representing the second differential value.

9. An image data compression apparatus comprising:

pixel input means for inputting pixel data d[i] one pixel by one pixel, subtracting means for calculating a differential value diff between a present pixel d[i] and a one-before pixel d[i-1];

determining means for determining whether said differential value diff is zero or not;

a number m of holding means for holding vectors vect[n] (n=0 to m) having high occurability;

a number m of comparing means for comparing the vectors vect[n] with said differential value diff;

computing means for computing said vectors vect[n]; and code output means for determining a compression code in accordance with results given by said determining means and said comparing means, and for outputting said compression code.

10. An image data compression apparatus as set forth in claim 9, further comprising means for compressing said compression code outputted from said code output means by use of another reversible compression method.

11. An image data compression apparatus as set forth in claim 9, further comprising means for rearranging pixel data, before said pixel input means.

12. An image data compression method comprising the steps of:

inputting pixel data d[i] one pixel by one pixel;

calculating a differential value diff between a present pixel and a one-before pixel d[i-1];

determining whether said differential value is zero or not;

holding vectors vect[n] (n=0 to m) having high occurability;

comparing said differential value diff with said vectors vect[n];

computing said vectors vect[n];

determining a compression code in accordance with results of said determining step and said comparing step, and outputting said compression code.

13. An image data compression apparatus comprising:

pixel inputting means for inputting pixel data d[i] one pixel by one pixel, subtracting means for calculating a differential value diff between a present pixel d[i] and a one-before pixel d[i-1];

determining means for determining whether said differential value is zero or not;

a number m of holding means for holding vector informations info[n] (n=0 to m);

computing means for computing vectors vect[n] having high occurability from said vector informations;

a number m of comparing means for comparing vectors vect[n] with said differential value diff; and code output means for determining a compression code in accordance with results given by said determining means and said comparing means, and for outputting said compression code.

14. An image data compression method comprising the steps of:

inputting pixel data d[i] one pixel by one pixel, calculating a differential value diff between a present pixel d[i] and a one-before pixel d[i-1];

determining whether said differential value is zero or not;

holding vector informations info[n] (n=0 to m);

computing vectors vect[n] having high occurability from said vector informations:

comparing vectors vect[n] with said differential value diff; and determining a compression code in accordance with results given by said determining step and said comparing step, and for outputting said compression code.

15. An image processing apparatus comprising:

differential means for outputting a differential value between an inputted first pixel data and a consecutively inputted second pixel data;

first hold means for previously holding a predetermined value in accordance with said differential value, and for updating the value held therein to said differential value;

first comparing means for comparing said differential value with said value held in said first holding means, and for outputting a first comparison result;

second hold means for previously holding a predetermined value, and for updating the value held therein to said first pixel data in accordance with said differential value and said first comparison result;

second comparing means for comparing said second pixel data with said value held in said second hold means, and for outputting a second comparison result;

third hold means for previously holding a predetermined value, and for updating the value held therein to the value held in said second hold means in accordance with said differential value and said first and second comparison results;

third comparing means for comparing said second pixel data with the value held in said third hold means, and for outputting a third comparison result; and code means for outputting a code in accordance with said differential value and said first, second and third comparison results.

16. An image processing apparatus comprising:

rearrangement means for rearranging inputted pixel data and for outputting said pixel data one pixel by one pixel;

latch means for latching said pixel data outputted from said rearrangement means;

differential means for outputting a differential value between a first pixel data latched by said latch means and a second pixel data consecutively outputted from said rearrangement means;

first hold means for previously holding a predetermined value, and for updating the value held therein to said differential value if said differential value is within a predetermined range;

first comparing means for comparing said differential value with the value held in said first hold means, and for outputting a first comparison result;

second hold means for previously holding a predetermined value, and for updating the value held therein to said first pixel data in accordance with said differential value and said first comparison result;

second comparing means for comparing said second pixel data with the value held in said second hold means, and for outputting a second comparison result;

third hold means for previously holding a predetermined value, and for updating the value held therein to the value held in said second hold means in accordance with said differential value and said first and second comparison results;

third comparing means for comparing said second pixel data with the value held in said third hold means, and for outputting a third comparison result; and code means for outputting a code in accordance with said differential value, and said first, second and third comparison results.

17. An image processing apparatus as set forth in claim 15 or 16, wherein said code means outputs a first code if said differential value is equal to a predetermined value, outputs a second code if said differential value is other than said predetermined value, and if said first comparison result exhibits coincidence;

outputs a third code if said differential value is other than said predetermined value, and if said first comparison result exhibits non-coincidence but said second comparison result exhibits coincidence;

outputs a fourth code if said differential value is other than said predetermined value, and if said first and second comparison results exhibit non-coincidence but said third comparison result exhibits coincidence; and outputs said second pixel data following a fifth code if said differential value is other than said predetermined value, and all of said first, second and third comparison results exhibit non-coincidence.

18. An image processing apparatus as set forth in claim 17, wherein said predetermined value is zero.

19. An image processing apparatus as set forth in claim 17, wherein said predetermined range is set in consideration with a gradation.

20. An image processing apparatus as set forth in claim 17, further comprising compression means for compressing a code outputted from said code means.

21. An image processing method comprising:

a differential step of outputting a differential value between an inputted first pixel data and a consecutively inputted second pixel data;

a first comparing step of comparing a first held value adapted to be updated to said differential value in accordance with said differential value, with said differential value, and outputting a first comparison result;

a second comparing step of comparing a second held value adapted to be updated to said first pixel data in accordance with said differential value and said first result, with said second pixel data, and for outputting a second comparison result;

a third comparing step of comparing a third held value adapted to be updated to said second held value in accordance with said differential value and said first and second comparison results, with said second pixel data and outputting a third comparison result; and a code step of outputting a code in accordance with said differential value and said first, second and third comparison results.

22. An image processing method comprising:

a differential step of outputting a differential value between an inputted first pixel data and a consecutively inputted second pixel data;

a first code step of outputting a first code if said differential value is equal to a predetermined value;

a second code step of outputting a second code if said differential value is other than said predetermined value, but said differential value coincides with a first held value;

a third code step outputting a third code if said differential value does not coincide with said first held value, but said second pixel data coincides with a second held value, and updating said second held value to said first pixel data;

a fourth code step of outputting a fourth code if said second pixel data does not coincide with said second held value but said second pixel data coincides with a third held value, and updating said third held value to said second held value while updating said second held value to said first pixel data; and a fifth code step of outputting said second pixel data following a fifth code if said second pixel data does not coincide with said third held value, updating said third held value to said second held value while updating said second held value to said first pixel data; and a differential value updating step of updating said first held value to said differential value when said differential value is in a predetermined range if said differential value does not coincide with said first held value.

23. A data compression apparatus for serially encoding differential values, comprising:

input means for serially inputting multi-level pixel data, each pixel data corresponding to one of a plurality of pixels in sequence;

generating means for serially generating a respective differential value between each two consecutive pixels based on the multi-level pixel data, said generating means generating a second differential value after generating a first differential value;

holding means for holding a representative value representing the first differential value; and encoding means for detecting, based on the representative value, whether or not the second differential value is equal to the first differential value, for encoding a result of the detecting as encoded data representing the first differential value, and for outputting the encoded data.

24. A data compression method for serially encoding differential values, comprising:

an input step of serially inputting multi-level pixel data, each pixel data corresponding to one of a plurality of pixels in sequence;

a generating step of serially generating a respective differential value between each two consecutive pixels based on the multi-level pixel data, said generating step generating a second differential value after generating a first differential value;

a holding step of holding a representative value representing the first differential value; and an encoding step of detecting, based on the representative value, whether or not the second differential value is equal to the first differential value, of encoding a result of the detecting as encoded data representing the first differential value, and of outputting the encoded data.

* * * * *

UNITED STATES PATENT AND TRADEMARK OFFICE
CERTIFICATE OF CORRECTION

PATENT NO. : 5,903,671

DATED : May 11, 1999

INVENTOR(S) : YUKARI TODA

It is certified that error appears in the above-identified patent and that said Letters Patent is hereby corrected as shown below:

COLUMN 19

Line 35, "coil" should read --col1--; and
Line 37, "codel" should read --code1--.

Signed and Sealed this

Fourteenth Day of December, 1999

Attest:

Q. TODD DICKINSON

Attesting Officer

Acting Commissioner of Patents and Trademarks